(12) United States Patent
Smith

(10) Patent No.: US 12,205,167 B1
(45) Date of Patent: *Jan. 21, 2025

(54) BOND INFORMATION SYSTEM AND RELATED METHODS OF OPERATION

(71) Applicant: Robert J. Smith, Birmingham, AL (US)

(72) Inventor: Robert J. Smith, Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/398,296

(22) Filed: Dec. 28, 2023

Related U.S. Application Data

(63) Continuation of application No. 18/232,492, filed on Aug. 10, 2023, now Pat. No. 11,900,460, which is a
(Continued)

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ................................ G06Q 40/04; G06Q 40/06
See application file for complete search history.

(56) References Cited

U.S. PATENT DOCUMENTS 8,589,280 B2 * 11/2013 Rosenthal .............. G06Q 40/04
705/37
10,242,407 B1  3/2019 Hunt
(Continued)

FOREIGN PATENT DOCUMENTS

KR  100616202  8/2006
WO    0161549  8/2001
(Continued)

OTHER PUBLICATIONS

Nagel et al.: Electronic trading in fixed income markets, Jan. 2016, Bank for International Settlements (BIS), pp. 1-50. (Year: 2016).*
(Continued)

*Primary Examiner* — Bijendra K Shrestha
(74) *Attorney, Agent, or Firm* — AdamsIP, LLC; Kenneth M. Bush

(57) ABSTRACT

In various aspects, a computer receives bond market information in digital form via a network cloud from various combinations of a trading computer of an electronic trading platform and an information computer of an information source and the computer then transforms the bond market information into a bond market analysis. Accordingly, the bond market information, which is generally disorganized digital information existing on various combinations of the trading computer and the information computer, is transmitted to the computer via the network cloud and then transformed by the computer into an organized bond market analysis, which is also in digital form, and which may be displayed in various ways. The computer may automatically generate order information in digital form in response to the bond market analysis and the computer may communicate the order via the network cloud to the trading computer for execution.

19 Claims, 13 Drawing Sheets

Related U.S. Application Data continuation of application No. 17/487,907, filed on Sep. 28, 2021, now Pat. No. 11,769,201, which is a continuation of application No. 16/746,080, filed on Jan. 17, 2020, now Pat. No. 11,164,253.

(56) References Cited

U.S. PATENT DOCUMENTS

| | | | |
|---|---|---|---|
| 10,319,034 B2 | 6/2019 | Singer et al. | |
| 11,164,253 B1 | 11/2021 | Smith | |
| 11,769,201 B1 | 9/2023 | Smith | |
| 2004/0153390 A1* | 8/2004 | Saulys | G06Q 40/06 705/37 |
| 2006/0085316 A1* | 4/2006 | Doire | G06Q 40/00 705/35 |

FOREIGN PATENT DOCUMENTS

| | | | |
|---|---|---|---|
| WO | 2008088206 | 7/2008 | |
| WO | WO-2008088206 A1 * | 7/2008 | G06Q 40/04 |
| WO | 2014158712 | 10/2014 | |
| WO | WO-2014158712 A1 * | 10/2014 | G06Q 40/04 |

OTHER PUBLICATIONS

Deloitte: Disruptions in Retail through Digital Transformation, Nov. 2017, pp. 1-64. (Year: 2017).*

Treasury Market Practices Group (TMPG): Automated Trading in Treasury Markets, Jun. 2015, pp. 1-9. (Year: 2015).*

Smith, Robert J.; Issue Notification for U.S. Appl. No. 16/746,080, filed Jan. 17, 2020, mailed Oct. 13, 2021, 1 pg.

Smith, Robert J.; Notice of Allowance for U.S. Appl. No. 16/746,080, filed Jan. 17, 2020, mailed Jun. 30, 2021, 18 pgs.

Bech et al.: Hanging up the phone—electronic trading in fixed income markets and its implications, Mar. 2016, BIS Quaterly Review, pp. 79-94 (Year: 2016).

Hollingsworth et al.: The Bond Market: How it Works, or How it Does't, Feb. 26, 2016, Third Way, pp. 1-15 (Year: 2016).

Peebles et al.: Playing With Fire: the Bond Liquidity Crunch and What to Do About it, Mar. 2016, pp. 1-16 (Year: 2016).

Smith, Robert J.; Issue Notification for U.S. Appl. No. 17/487,907, filed Sep. 28, 2021, mailed Sep. 6, 2023, 2 pgs.

Smith, Robert J.; Notice of Allowance for U.S. Appl. No. 17/487,907, filed Sep. 28, 2021, mailed Jun. 14, 2023, 21 pgs.

BlackRock: The next generation bond market, pp. 1-24 (Year: 2017).

Financial Pipeline Staff: What are Bond Spreads?, Feb. 19, 2016, Financial Pipeline, pp. 1-7 (Year: 2016).

Gonzalez-Fernandez et al.: Bond Yields, Sovereign Risk and Maturity Structure, Aug. 8, 2018, Risks, pp. 1-25 (Year: 2018).

Smith, Robert J.; Notice of Allowance for U.S. Appl. No. 18/232,492, filed Aug. 10, 2023, mailed Oct. 4, 2023, 25 pgs.

* cited by examiner

Table VI

| 1/9/2018 | 3mo Libor | 1.71% | EDSF | 1.87% | | | | | | | | | | |
|---|---|---|---|---|---|---|---|---|---|---|---|---|---|---|
| | 2020 | 2021 | 2022 | 2023 | 2024 | 2025 | 2026 | 2027 | 2028 | 2038 | 2048 | |
| | 2 | 3 | 4 | 5 | 6 | 7 | 8 | 9 | 10 | 20 | 30 | |
| Yields | | | | | Buy Matrix | | | | | | | |
| 1 | 1.92% | 2.01% | 2.13% | 2.25% | 2.32% | 2.38% | 2.41% | 2.43% | 2.46% | 2.64% | 2.81% | Treasury |
| 1 | 0.21% | 0.22% | 0.23% | 0.23% | 0.24% | 0.25% | 0.25% | 0.27% | 0.27% | 0.34% | 0.41% | AAA (JNJ) |
| 2 | 0.26% | 0.27% | 0.28% | 0.29% | 0.29% | 0.31% | 0.31% | 0.33% | 0.33% | 0.42% | 0.50% | AA+ |
| 9 | 1.16% | 1.20% | 1.24% | 1.28% | 1.31% | 1.35% | 1.39% | 1.43% | 1.46% | 1.84% | 2.21% | BBB (T/VZ) |
| 10 | 1.44% | 1.49% | 1.53% | 1.58% | 1.62% | 1.67% | 1.71% | 1.77% | 1.81% | 2.27% | 2.73% | BBB- |
| 11 | 1.78% | 1.84% | 1.89% | 1.95% | 2.00% | 2.06% | 2.12% | 2.19% | 2.24% | 2.81% | 3.38% | BB+ |
| 12 | 2.20% | 2.27% | 2.34% | 2.41% | 2.48% | 2.55% | 2.62% | 2.70% | 2.75% | 3.47% | 4.17% | BB |
| 17 | 6.35% | 6.55% | 6.75% | 6.96% | 7.16% | 7.36% | 7.56% | 7.77% | 7.97% | 10.01% | 12.05% | CCC+ |
| 18 | 7.84% | 8.10% | 8.35% | 8.60% | 8.85% | 9.10% | 9.35% | 9.61% | 9.86% | 12.37% | 14.89% | CCC |
| 19 | 9.70% | 10.01% | 10.32% | 10.63% | 10.94% | 11.25% | 11.56% | 11.88% | 12.18% | 15.30% | 18.40% | CCC- |
| 20 | 11.98% | 12.37% | 12.75% | 13.14% | 13.52% | 13.91% | 14.29% | 14.68% | 15.06% | 18.91% | 22.75% | Distressed |

FIG. 6

Table VII

| 1/9/2018 | 3mo Libor | 1.71% | EDSF | 1.87% | | | | | | | | | | |
|---|---|---|---|---|---|---|---|---|---|---|---|---|---|---|
| Interpolated Treasury MatrixPhi | | | | | | | | | | | | | | |
| | 2020 | 2021 | 2022 | 2023 | 2024 | 2025 | 2026 | 2027 | 2028 | 2038 | 2048 | | | |
| Yields | 2 | 3 | 4 | 5 | 6 | 7 | 8 | 9 | 10 | 20 | 30 | | | |

Buy Matrix

| | 2 | 3 | 4 | 5 | 6 | 7 | 8 | 9 | 10 | 20 | 30 | |
|---|---|---|---|---|---|---|---|---|---|---|---|---|
| 1 | 1.92% | 2.01% | 2.13% | 2.25% | 2.32% | 2.38% | 2.41% | 2.43% | 2.46% | 2.64% | 2.81% | Treasury |
| | 2.13% | 2.23% | 2.36% | 2.48% | 2.56% | 2.63% | 2.66% | 2.70% | 2.73% | 2.98% | 3.22% | AAA (JNJ) |
| 2 | 2.18% | 2.28% | 2.41% | 2.54% | 2.61% | 2.69% | 2.72% | 2.76% | 2.79% | 3.06% | 3.31% | AA+ |
| 9 | 3.08% | 3.21% | 3.37% | 3.53% | 3.63% | 3.73% | 3.80% | 3.86% | 3.92% | 4.48% | 5.02% | BBB (T/VZ) |
| 10 | 3.36% | 3.50% | 3.66% | 3.83% | 3.94% | 4.05% | 4.12% | 4.20% | 4.27% | 4.91% | 5.54% | BBB- |
| 11 | 3.70% | 3.85% | 4.02% | 4.20% | 4.32% | 4.44% | 4.53% | 4.61% | 4.70% | 5.45% | 6.19% | BB+ |
| 12 | 4.12% | 4.28% | 4.47% | 4.66% | 4.80% | 4.93% | 5.03% | 5.13% | 5.22% | 6.11% | 6.98% | BB |
| 17 | 8.27% | 8.56% | 8.86% | 9.11% | 9.40% | 9.74% | 9.97% | 10.20% | 10.43% | 12.65% | 14.86% | CCC+ |
| 18 | 9.76% | 10.11% | 10.46% | 10.85% | 11.17% | 11.48% | 11.76% | 12.04% | 12.32% | 15.01% | 17.70% | CCC |
| 19 | 11.62% | 12.03% | 12.45% | 12.88% | 13.26% | 13.63% | 13.97% | 14.31% | 14.64% | 17.93% | 21.21% | CCC- |
| 20 | 13.90% | 14.38% | 14.88% | 15.39% | 15.84% | 16.29% | 16.70% | 17.11% | 17.52% | 21.55% | 25.58% | Distressed |

FIG. 7

Table VIII

1/9/2018
Interpolated Treasury SELL MatrixPhi

| Yields | 2020 (2) | 2021 (3) | 2022 (4) | 2023 (5) | 2024 (6) | 2025 (7) | 2026 (8) | 2027 (9) | 2028 (10) | 2038 (20) | 2048 (30) | |
|---|---|---|---|---|---|---|---|---|---|---|---|---|
| | | | | | | SELL Matrix | | | | | | |
| | 1.92% | 2.01% | 2.13% | 2.25% | 2.32% | 2.38% | 2.41% | 2.43% | 2.46% | 2.64% | 2.81% | Treasury |
| 1 | 2.03% | 2.13% | 2.26% | 2.38% | 2.46% | 2.53% | 2.56% | 2.60% | 2.63% | 2.88% | 3.12% | AAA |
| 2 | 2.06% | 2.16% | 2.29% | 2.42% | 2.49% | 2.56% | 2.60% | 2.63% | 2.67% | 2.93% | 3.19% | AA+ |
| 3 | 2.09% | 2.19% | 2.32% | 2.46% | 2.53% | 2.61% | 2.64% | 2.68% | 2.72% | 3.00% | 3.28% | AA |
| 11 | 2.87% | 3.01% | 3.19% | 3.37% | 3.49% | 3.61% | 3.70% | 3.78% | 3.86% | 4.61% | 5.35% | BB+ |
| 12 | 3.09% | 3.25% | 3.44% | 3.63% | 3.77% | 3.90% | 4.00% | 4.10% | 4.19% | 5.08% | 5.96% | BB |
| 13 | 3.37% | 3.54% | 3.75% | 3.96% | 4.11% | 4.26% | 4.38% | 4.49% | 4.60% | 5.66% | 6.70% | BB- |
| 16 | 4.65% | 4.91% | 5.19% | 5.48% | 5.71% | 5.94% | 6.13% | 6.32% | 6.51% | 8.34% | 10.15% | B- |
| 17 | 5.30% | 5.59% | 5.91% | 6.24% | 6.51% | 6.77% | 7.00% | 7.23% | 7.47% | 9.68% | 11.89% | CCC+ |
| 18 | 6.09% | 6.44% | 6.81% | 7.18% | 7.50% | 7.81% | 8.09% | 8.37% | 8.65% | 11.34% | 14.03% | CCC |
| 19 | 7.08% | 7.48% | 7.91% | 8.34% | 8.72% | 9.09% | 9.43% | 9.77% | 10.11% | 13.40% | 16.68% | CCC- |
| 20 | 8.30% | 8.77% | 9.28% | 9.78% | 10.23% | 10.68% | 11.09% | 11.50% | 11.91% | 15.94% | 19.95% | Distressed |

FIG. 8

Table IX

| 1/9/2018 | 3moLibor | 1.71% EDSF | 1.87% | | | | | | | | | | | |
|---|---|---|---|---|---|---|---|---|---|---|---|---|---|---|
| Buy-Sell MatrixPhi | | | | | | | | | | | | | | |
| | 2yr 1.92% | | 2020 | | 3yr 2.01% | | 2022 | | 5yr 2.25% | | 2023 | | 7yr 2.38% | |
| | Buy | Sell | Buy | Sell | Buy | Sell | Buy | Sell | Buy | Sell | Buy | Sell | Buy | Sell |

| | 2yr | | 2020 | | 3yr | | 2022 | | 5yr | | 2023 | | 7yr | | 2025 | | 10yr | | 2028 | | 30yr | | 2048 | |
|---|---|---|---|---|---|---|---|---|---|---|---|---|---|---|---|---|---|---|---|---|---|---|---|---|
| | 1.92% | | | | 2.01% | | | | 2.25% | | | | 2.38% | | 2.53% | | 2.46% | | 2.63% | | 2.81% | | | |
| | Buy | Sell | Buy | Sell | Buy | Sell | Buy | Sell | Buy | Sell | Buy | Sell | Buy | Sell | Buy | Sell | Buy | Sell | Buy | Sell | Buy | Sell | Treasury | |
| 1 | 2.13% | 2.03% | 2.36% | 2.26% | 2.48% | 2.38% | 2.63% | 2.53% | 2.73% | 2.63% | 3.22% | 3.12% | AAA | |
| 8 | 2.86% | 2.42% | 3.13% | 2.69% | 3.28% | 2.84% | 3.47% | 3.03% | 3.64% | 3.20% | 4.60% | 4.16% | BBB+ | |
| 9 | 3.08% | 2.54% | 3.37% | 2.82% | 3.53% | 2.98% | 3.73% | 3.19% | 3.92% | 3.38% | 5.02% | 4.48% | BBB | |
| 10 | 3.36% | 2.69% | 3.66% | 2.99% | 3.83% | 3.15% | 4.05% | 3.38% | 4.27% | 3.60% | 5.54% | 4.87% | BBB- | |
| 11 | 3.70% | 2.87% | 4.02% | 3.19% | 4.20% | 3.37% | 4.44% | 3.61% | 4.70% | 3.86% | 6.19% | 5.35% | BB+ | |
| 12 | 4.12% | 3.09% | 4.47% | 3.44% | 4.66% | 3.63% | 4.93% | 3.90% | 5.22% | 4.19% | 6.98% | 5.96% | BB | |
| 13 | 4.64% | 3.37% | 5.02% | 3.75% | 5.23% | 3.96% | 5.53% | 4.26% | 5.88% | 4.60% | 7.97% | 6.70% | BB- | |
| 14 | 5.28% | 3.71% | 5.71% | 4.13% | 5.93% | 4.36% | 6.28% | 4.71% | 6.68% | 5.11% | 9.19% | 7.62% | B+ | |
| 15 | 6.07% | 4.13% | 6.55% | 4.61% | 6.80% | 4.86% | 7.20% | 5.26% | 7.66% | 5.74% | 10.69% | 8.75% | B | |
| 16 | 7.05% | 4.65% | 7.59% | 5.19% | 7.88% | 5.48% | 8.34% | 5.94% | 8.91% | 6.51% | 12.56% | 10.15% | B- | |
| 17 | 8.27% | 5.30% | 8.89% | 5.91% | 9.21% | 6.24% | 9.74% | 6.77% | 10.19% | 7.47% | 14.89% | 11.89% | CCC+ | |
| 18 | 9.76% | 6.09% | 10.48% | 6.81% | 10.85% | 7.18% | 11.48% | 7.81% | 12.32% | 8.65% | 17.70% | 14.03% | CCC | |
| 19 | 11.62% | 7.08% | 12.45% | 7.91% | 12.88% | 8.34% | 13.63% | 9.09% | 14.64% | 10.11% | 21.21% | 16.68% | CCC- | |
| 20 | | | | | | | | | | | | | Distressed | |

FIG. 9

Table X

| | 1 | 2 | 3 | SYM | BOND | | BID | | ASK | | Last Trade | PROFIT | | RATING | Risk r |
|---|---|---|---|---|---|---|---|---|---|---|---|---|---|---|---|
| | 18.20 | 6.11% | 7.62% | NBR | 5.00% | 9/15/2020 | 7.49% | 97.78 | 7.36% | 97.89 | 97.100 | 8.27% | 0.68 | B1/BB Stable | 13.00 |
| | 18.20 | 6.49% | 8.00% | NBR | 4.63% | 9/15/2021 | 7.83% | 94.33 | 7.66% | 94.62 | 91.232 | 9.69% | 3.10 | B1/BB Stable | 13.00 |
| | 18.30 | 8.16% | 9.67% | DO (CDS 793) | 7.88% | 8/15/2025 | 9.58% | 92.47 | 9.49% | 92.85 | 74.500 | 14.47% | 17.97 | B3/B | 15.50 |
| | 18.30 | 13.70% | 15.63% | DO | 5.70% | 10/15/2039 | 15.13% | 41.04 | 14.63% | 42.57 | 46.500 | 13.48% | (3.93) | B3/B | 15.50 |
| | 20.20 | 20.96% | 22.90% | NE | 6.20% | 8/1/2040 | 22.06% | 28.99 | 21.23% | 30.23 | 40.000 | 16.44% | (9.77) | Caa2/CCC+ | 17.50 |
| | 20.20 | 21.30% | 23.25% | NE | 6.05% | 3/1/2041 | 22.39% | 27.78 | 21.53% | 28.98 | 43.000 | 15.01% | (14.02) | Caa2/CCC+ | 17.50 |
| | 19.75 | 9.59% | 11.06% | RIG | 5.80% | 10/15/2022 | 10.80% | 87.40 | 10.53% | 88.01 | 96.070 | 7.27% | (8.06) | caa2/B-/B+ | 17.00 |
| | 19.75 | 9.75% | 11.21% | RIG | 0.50% | 1/30/2023 | 10.68% | 72.20 | 10.14% | 73.42 | 79.000 | 7.81% | (5.58) | caa2/B-/B+ | 17.00 |
| | 18.75 | 8.08% | 9.55% | RIG (CDS 855) | 9.00% | 7/15/2023 | 9.52% | 98.35 | 9.49% | 98.44 | 101.000 | 8.68% | 2.56 | Caa1/B | 16.00 |
| | 18.75 | 9.07% | 10.59% | RIG (CDS 855) | 7.25% | 11/1/2025 | 10.42% | 85.99 | 10.25% | 86.57 | 86.500 | 10.29% | (0.25) | Caa1/B | 16.00 |
| | 18.75 | 9.16% | 10.68% | RIG | 7.50% | 1/15/2026 | 10.53% | 86.34 | 10.37% | 87.00 | 87.250 | 10.31% | 4.70 | caa2/B-/B+ | 17.00 |
| | 19.75 | 11.98% | 13.55% | RIG tender | 7.45% | 4/15/2027 | 13.25% | 72.91 | 12.94% | 74.08 | 68.208 | 14.54% | (0.42) | caa2/B-/B+ | 17.00 |
| | 19.75 | 11.98% | 13.55% | RIG tender | 8.00% | 4/15/2027 | 13.28% | 75.37 | 13.00% | 76.46 | 76.875 | 12.89% | (10.25) | caa2/B-/B+ | 17.00 |
| | 19.75 | 14.11% | 15.79% | RIG | 7.50% | 4/15/2031 | 15.37% | 58.08 | 14.96% | 59.60 | 69.850 | 12.51% | (17.52) | caa2/B-/B+ | 16.00 |
| | 19.75 | 17.79% | 19.66% | RIG | 6.80% | 3/15/2038 | 19.02% | 37.99 | 18.38% | 39.45 | 56.968 | 13.00% | (13.29) | caa2/B-/B+ | 16.00 |
| | 19.75 | 19.79% | 21.74% | RIG | 9.35% | 12/15/2041 | 21.12% | 44.86 | 20.50% | 46.26 | 59.550 | 16.06% | | caa2/B-/B+ | 16.00 |

BOND INFORMATION SYSTEM AND RELATED METHODS OF OPERATION

CROSS-REFERENCE TO RELATED APPLICATIONS

The present application claims priority to and benefit of U.S. patent application Ser. No. 18/232,492 filed on Aug. 10, 2023, which claims priority to and benefit of U.S. patent application Ser. No. 17/487,907 filed on Sep. 28, 2021, now U.S. Pat. No. 11,769,201, which claims priority to and benefit of U.S. patent application Ser. No. 16/746,080 filed on Jan. 17, 2020, now U.S. Pat. No. 11,164,253, the disclosures of which are incorporated herein by reference in their entirety.

FIELD OF THE INVENTION

This disclosure relates to computer implemented methods and related apparatus and compositions of matter for automatically organizing digital bond market information into a bond market analysis, the automatic digital display of the bond market analysis, and automatically acting upon the bond market analysis in the bond market.

BACKGROUND OF THE INVENTION

The bond market is global in extent. In aggregate, the global bond market is about three times the size of the global equity market. Bonds worldwide may total roughly $100 trillion. In the U.S. alone, the corporate bond market is approximately $40 trillion in valuation as compared to the equity market at around $20 trillion in valuation. The daily volume of bonds traded exceeds $700 billion, while, in comparison, the NYSE has an average daily volume of around $4 billion.

Bond, as used herein, may include, for example, corporate debt securities, securitized loans, debt securities issued by private non-profit entities such as colleges and universities, debt securities issued by government and quasi-government entities, and other securities, as would be readily recognized by those of ordinary skill in the art upon study of this disclosure. The universe of bonds is very large with a wide variety of maturities and ratings. Some bonds may be thinly traded so there is little or no market information available that may be indicative of valuation.

Bondholders, those who hold bonds however briefly, are exposed to various risks such as changes in interest rates and the ability of a bond issue to pay interest or principal that result in volatility of bond prices. The ultimate underlying concern of the bondholder is receipt of the proper compensation for the risk the bondholder assumes.

Volatility may vary as a function of the financial strength of the issuer, macroeconomic changes, the maturity of the bond. For example, a 30 year corporate bond issued by a company with an AA rating is likely to be more than 4 times more volatile than a 5 year corporate bond issued by the same company. The yield of the 30 year bond may be 1% greater than the yield of the 5 year bond. As of this writing, a high yield B rated 30 year bond is only 2.02 times more volatile than the 5 year bond and the 30 year bond has a 5.50% greater yield than the 5 year bond in compensation for the greater risk. Note that, as of this writing, the U.S. Treasury 30 year is 4.5 times more volatile than the U.S. Treasury 5 year with a 0.75% yield differential. Prices can change quickly in response to changes in the financial strength of the issuer and/or in response to changes in macroeconomic conditions.

In the past, certain rules of thumb were used by human participants in the bond market to value bonds that were often traded on exchanges by open outcry. However, these rules of thumb, while being quick to apply, lack rigor. Furthermore, trading has now moved to electronic trading platforms, and trading may be conducted at high speed with little or no human intervention. Ever increasing quantities of bonds are being traded using electronic trading platforms-computer software operable to manage sale and purchase of bonds electronically over a network cloud. Bonds may be traded electronically from any location with much faster execution of trades in contrast with floor trading using open outcry. Because of the size and variety of the universe of bonds, the rapidity of price changes, and the overall speed of electronic trading, such rules of thumb are now inadequate for increasingly automated electronic trading in a global market.

Trading using electronic trading platforms occurs in an unorganized manner, with random quantities, random bonds (issuer, maturity, coupon) being traded at various prices electronically at random times. Changes in the financial strength of the issuer and changes in macroeconomic conditions occur suddenly without warning, and these changes are communicated electronically via the network cloud. All this results in a practical problem of responding in real time to bond market information that originates, at least in part, in electronic format from electronic trading platform(s). Responding in real time may include organization and presentation of the bond market information to a user, for example, to allow the user to assess the bond market information. For example, organizing the bond market information to allow the user to determine proper compensation for risk. The organizing should occur without human intervention due to the speed at which the bond market information is generated and communicated. Responses to the bond market information require automation due to the speed at which trading and corresponding changes in price may occur, and may need to occur without human intervention.

Accordingly, there is a need for improved methods as well as related apparatus and compositions of matter for responding to bond market information including organizing bond market information, displaying the organized bond market information to the user, and acting upon the bond market information.

BRIEF SUMMARY OF THE INVENTION

These and other needs and disadvantages may be overcome by the methods and related apparatus and compositions of matter disclosed herein. Additional improvements and advantages may be recognized by those of ordinary skill in the art upon study of the present disclosure.

A method of displaying a bond market analysis in real time in response to trading occurring digitally using a trading computer on an electronic trading platform is disclosed herein. In various aspects, the method may include the step of receiving by a computer a user selection comprising a guide T, wherein the guide T includes one or more guide bonds, and the step of communicating bond market information with the computer from said trading computer via a network cloud in real time, in various aspects. The bond market information may include prices of the one or more guide bonds of the guide T from said trading occurring digitally on said trading computer, in various aspects, with the bond market information being in digital form on said trading computer. In various aspects, the method may include the step of transforming by the computer the guide T into one or more spreads S using the bond market information, each spread $S=f(r, t, \phi)$ being a function $f$ of golden mean $\phi$ and the function $f$ of risk r and maturity t. In various aspects, the method may include the step of organizing by the computer the spread S according to maturity t and risk r thereby forming at least a portion of said bond market analysis, and the step of displaying by the computer said bond market analysis using a display.

In various aspects, the computer receives bond market information in digital form via a network cloud from various combinations of a trading computer of an electronic trading platform and an information computer of an information source, and the computer then transforms the bond market information into a bond market analysis. Accordingly, the bond market information, which is generally disorganized digital information existing on one or more computers such as the trading computer and the information computer, is transmitted to the computer via the network cloud and then transformed by the computer into an organized bond market analysis, which is also in digital form, and which may be displayed in various ways. In various aspects, the computer may automatically generate order information in digital form in response to the bond market analysis, and the computer may communicate the order execution via the network cloud to the trading computer for execution. Related apparatus and compositions of matter are also disclosed herein.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

BRIEF DESCRIPTION OF THE DRAWINGS

FIG. 6 illustrates an exemplary image as may be displayed on a display of the exemplary bond information system of FIG. 1A;

FIG. 7 illustrates a second exemplary image as may be displayed on a display of the exemplary bond information system of FIG. 1A;

FIG. 8 illustrates a third exemplary image as may be displayed on a display of the exemplary bond information system of FIG. 1A;

FIG. 9 illustrates a fourth exemplary image as may be displayed on a display of the exemplary bond information system of FIG. 1A;

FIG. 11 illustrates a fifth exemplary image as may be displayed on a display of the exemplary bond information system of FIG. 1A;

Figure 1A:
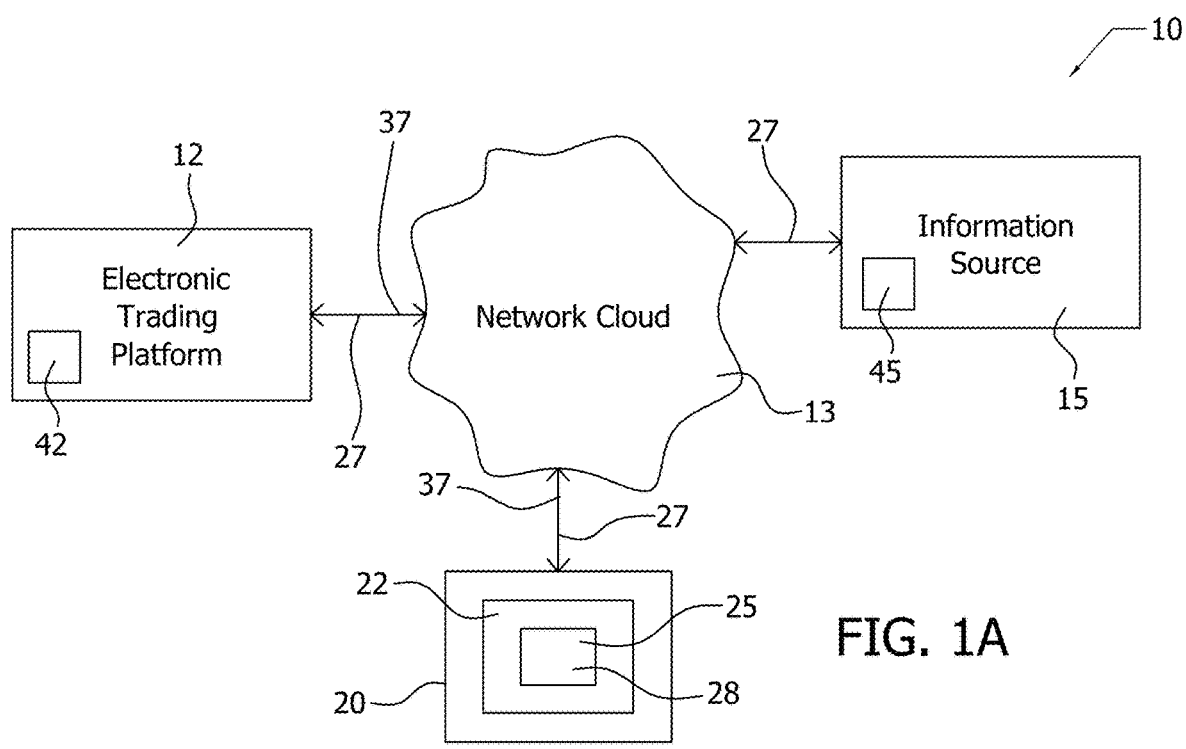
FIG. 1A illustrates by schematic diagram an exemplary bond information system.

The Figures are exemplary only, and the exemplary implementations illustrated therein are selected to facilitate explanation. The Figures including the methods, apparatus, and compositions of matter illustrated in the Figures are not to be considered limiting unless expressly so stated. For example, the components of various apparatus illustrated in the Figures may be selected for explanatory purposes, and the components may be grouped in the Figures in various ways to facilitate description, so that the apparatus may include various other components or the components may be grouped in various other ways, in other implementations. The steps in the various methods illustrated in the Figures, for example, may be performed in other orders, or the steps in the various methods may be divided or subdivided in various ways, in other implementations. Information flows and process flows in the Figures included herein are indicated by arrows, and are selected for explanatory purposes. It should be understood that other information flows may occur between various components and that other process flows may occur, in various other implementations.

The number, position, relationship and dimensions of the elements shown in the Figures to form the various implementations described herein are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the Figures and are utilized to facilitate description thereof. Use herein of relative terms such as generally, about, approximately, essentially, may be indicative of engineering, manufacturing, computational, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

Methods implemented by a bond information system for displaying a bond market analysis in real time in response, at least in part, to trading occurring on an electronic trading platform are disclosed herein, in various aspects. The methods implemented by the bond information system use a guide that includes one or more guide bonds from which the bond market analysis is generated, in various aspects. Bond market information that exists in various digital formats is communicated to a computer via a network cloud in real time without human intervention, and the computer then generates the bond market analysis in real time without human intervention, in various aspects. The bond market information includes at least prices of the one or more guide bonds of the guide from said trading occurring on the electronic trading platform. Without human intervention, the computer then transforms the guide T into one or more spreads S using the bond market information, each spread S being a function $f$ of golden mean $\phi$ and the function $f$ of risk r and maturity t, in various aspects. The computer may organize the spread(s) S according to maturity t and risk r thereby forming at least a portion of said bond market analysis, and the computer may display the bond market analysis using a display. The bond market analysis may be acted upon by prompting automatic generation of order information that is then communicated from the computer to the electronic trading platform via the network cloud, in various aspects.

In various aspects, spread S' is indicative of added yield with respect to the guide T' necessary for fair compensation for risk. The bond market including various sectors of the bond market may be analyzed to determine yield Y that fairly compensates for risk, in various aspects. In certain aspects, a specific bond or group of bonds can be priced as to relative value using the methods disclosed herein thereby indicating whether or not the specific bond or group of bonds should be bought or sold. Method disclosed herein automate electronic order entry direct to marketplace, in various aspects. Methods disclosed herein include check on SRO rating with 1) fundamental analysis, 2) credit default swaps, 3) reverse rating computation, in various aspects.

Accordingly, methods disclosed herein may convert unorganized bond market information in digital form from a variety of sources and having a variety of formats into the bond market analysis having organized form and the bond market analysis may be acted upon automatically, in various aspects. The bond market analysis is displayed in a manner comprehensible to a user using a display, in various aspects. The bond information system disclosed herein may represent an improvement in organizing the pricing thereby allowing the user to view pricing in a bond market as indicated by the pricing of the trades. The bond information system disclosed herein may represent an improvement in analyzing the pricing thereby allowing the user to assess pricing in a bond market as indicated by the pricing of the trades.

In various aspects, methods disclosed herein are directed to the problem of displaying a bond market analysis in real time in response to pricing of trades occurring by computer execution on one or more electronic trading platforms. In various aspects, mathematical concepts employed by the bond information system are integrated into a process of communicating bond market information between the electronic trading platform and the computer including the display. Thus, in various aspects, information received from one computer is transformed for display on another computer, in part, using the mathematical concepts employed by the bond information system.

Bond information systems disclosed herein may include various methods implemented in operable software and may include various apparati that may implement the various method steps of the various methods. Compositions of matter disclosed herein include non-transitory media that includes computer readable instructions that, when executed, cause one or more computers to function as at least portions of the apparatus disclosed herein or to implement method steps of the methods disclosed herein.

Software may be, for example, in the form of high-level code such as C or Java, may be in the form of machine code, or both. Software may be, for example, in the form of a spreadsheet, such as Microsoft Excel, using a grid of cells arranged in rows and columns to organize data manipulations, and various programming languages such as Visual Basic may be integrated with the spreadsheet. In some aspects, the software may execute on one computer. In other aspects, two or more computers may communicate with one another via network, and the software may be organized in various ways such that portions of the software may be distributed operatively over the two or more computers to be executed by the two or more computers. Although generally described as implemented by software, the methods disclosed herein may be implemented, at least in part, in hardware or in a combination of hardware and software in various aspects. As would be recognized by those of ordinary skill in the art upon study of this disclosure, the methods, apparatus, and compositions of matter disclosed herein may be practiced in distributed computing environments where certain tasks are performed by processors that are linked by network. A nominal representation of data may either be the data itself or a pointer, description, or other data that may be used to create the data.

As used herein, computer includes a computer with one or more processors that may, in various aspects, include memory, display, mouse, keyboard, data storage device(s), I/O device(s), and so forth. Computer may include, for example, single-processor or multiprocessor computers, minicomputers, mainframe computers, cloud computers, distributed computing, grid computing, as well as personal computers, hand-held computing devices, mobile devices, cellular telephones, smartphones, tablets, and other processor-based devices. Display includes, for example, computer screen, video display, monitor, virtual reality display, mixed reality display, and other visual interfaces.

Network cloud, network, and similar terms, as used herein, include the Internet, cellular telephone networks (e.g., 4G, 5G, 6G), text messaging networks (e.g., MMS or SMS networks), local area networks (LANs), wide area networks (WANs), and combinations thereof. Data may be communicated over the network cloud by various wired and wireless technologies and combinations thereof. The network cloud may include various data storage devices, input/output devices, servers, routers, amplifiers, wireless transmitters, wireless receivers, optical devices, computers, and so forth, as would be recognized by those of ordinary skill in the art upon study of this disclosure.

Figure 1B:
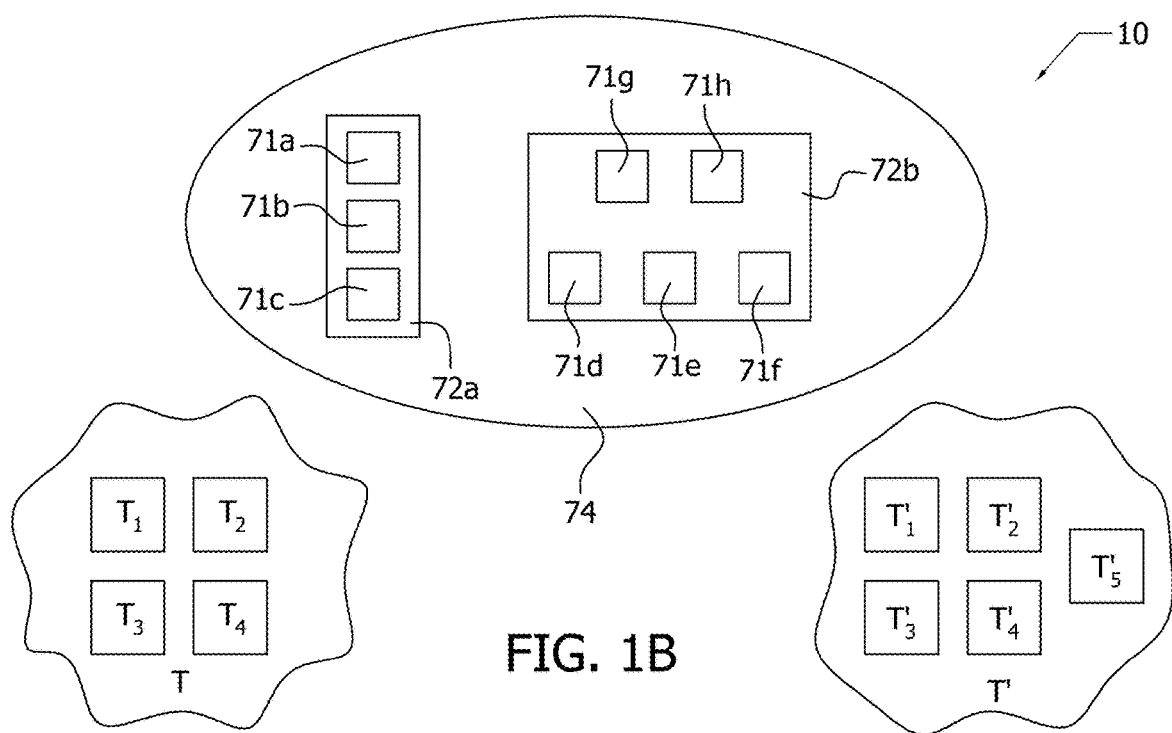
FIG. 1B illustrates by schematic diagram certain aspects of the exemplary bond information system of FIG. 1A.

FIGS. 1A and 1B illustrate various portions of exemplary bond information system 10. As illustrated in FIG. 1A, bond information system 10 including electronic trading platform 12 linked with computer 20 via network cloud 13. Bonds, such as bonds 71a, 71b, 71c, 71d, 71e, 71f, 71g, 71h, as well as guide bonds $T_1$, $T_2$, $T_3$, $T_4$ and second guide bonds $T_1'$, $T_2'$, $T_3'$, $T_4'$, $T_5'$, illustrated in FIG. 1B, may trade on electronic trading platform 12. Using trading computer 42, electronic trading platform 12 may allow direct digital interaction between participants, may be a digital interaction between participants with broker-dealers acting as intermediaries, or may be at least a digital part of an exchange. Exemplary electronic trading platform 12 may include, for example, Bloomberg, Tradeweb, MarketAxess, active treasury markets, any connected Alternative Trading System (ATS), or exchange (e.g. NYSE, NASDAQ. LSE). Electronic trading platform 12 may or may not have any permanency or physical location. For example, electronic trading platform 12 may be implemented in a distributed computing environment. Therefore, electronic trading platform 12 is merely representative in Figure JA for explanatory purposes. As illustrated, electronic trading platform 12 communicates bond market information 27 with network cloud IS.

Information computer 45 of information source 15 communicates with computer 20 via network cloud 15. Information source 15 may include, for example, Bloomberg, Standard & Poor's. Dow Jones & Co., and other sources of financial, market, news, and information operatively configured to communicate bond market information 27. In some implementations, information source 15 may be coextensive, at least in part, with electronic trading platform 12.

Bonds, such as bonds 71a, 71b, 71c, 71d, 71e, 71f, 71g, 71h, as well as guide bonds $T_1, T_2, T_3, T_4$ and second guide bonds $T_1', T_2', T_3', T_4', T_5'$ may be identified within bond information system 10 using Committee on Uniform Securities Identification Procedures (CUSIP), which is a numeric or alphanumeric code that identifies a North American financial security for the purposes of facilitating clearing and settlement of trades. The CUSIP was adopted as an American National Standard under Accredited Standards X9.6, and CUSIP identification number is assigned to all securities including stocks and bonds in the United States and Canada. Fidelity Investments maintains a free database tool which allows users to look up information about any registered bond using only the CUSIP number. This includes the market value of the bond as well as the current coupon, yield to maturity, credit score and other bond attributes specific to the issue. The Fidelity database tool provides the market value of the bond as both a price and a yield. A CIN (CUSIP International Numbering System) is used for securities issued in foreign markets. International Securities Identification Number (ISIN) are used internationally. These CUSIP, CIN, ISIN numbers are used to help facilitate trades and settlements by providing a constant identifier to help distinguish the securities within a trade. Each trade and the corresponding CUSIP number are recorded to facilitate the tracking of actions and activities.

Computer 20 communicates with network cloud 13 to receive bond market information 27 that may be used, at least in part, to generate bond market analysis 28, in this implementation. Bond market information 27 may be generated in digital form, at least in part, by digital trading occurring using trading computer 42 of electronic trading platform 12. Computer 20 includes display 22 that displays image 25 indicative of bond market analysis 28 at an instant in time t. Note that, while computer 20 is illustrated as a discrete computer for explanatory purposes, computer 20 may represent a distributed computing environment comprising processors linked by network cloud 13. Bond market information 27 may be received in digital form by computer 20 from various combinations of electronic trading platform(s), such as electronic trading platform 12, and information source(s), such as information source 15, in various implementations. Computer 20 may communicate with various combinations of electronic trading platform(s), such as electronic trading platform 12, and information source(s), such as information source 15, to request bond market information 27 therefrom. Note that electronic trading platform 12 may communicate bond market information 27 to information source 15 that, in turn, may communicate the bond market information to computer 20.

Bond market information 27, which is in digital form, may include, for example, volume, sale price, bid price, ask price, time, exchange, rating, coupon, maturity, historical data, news, financial information related to a bond, such as bond 71a, 71b, 71c, 71d, 71e, 71f, 71g, 71h. Bond market information may include, for example, profit and loss statement(s), cash flow statement(s), balance sheet(s), and shareholder equity statement(s) of the issuer, such as issuer 72a, 72b, of the bond. Bond market information 27 may vary in real time. Bond information 27 may be updated in response to trades, changes in rating, and so forth. In response to bond information 27, computer 20 generates bond market analysis 28 for display as image 25 on display 22.

Computer 20 communicates with network cloud 13 to transmit order information 37 to electronic trading platform 12 for execution. Order information 37 may include orders to buy including quantity and bid price and order information 37 may include orders to sell including quantity and ask price. Order information 37 may be generated automatically by computer 20 and automatically communicated from computer 20 to electronic trading platform 12 via network cloud 13 in response to bond market analysis 28.

FIG. 1B illustrates bond information system 10 including bonds 71a, 71b, 71c that are issued by issuer 72a, and bonds 71d, 71e, 71f, 71g, 71h that are issued by issuer 72b. Bonds 71a, 71b, 71c, 71d, 71e, 71f, 71g, 71h may be denoted by ticker symbol of issuer 72a, 72b, by coupon yield, and by maturity t usually given as a date. Bonds 71a, 71b, 71c of issuer 72a and bonds 71d, 71e, 71f, 71g, 71h form a part of bond group 74, as illustrated in FIG. 1B. An issuer, such as issuer 72a, 72b, may issue any number of bonds, such as bonds 71a, 71b, 71c, 71d, 71e, 71f, 71g, 71h, having various coupon yield(s) and maturity date(s). Bond group 74 may include a single bond of a single issuer, may include all bonds traded anywhere in the world, or other groupings of bonds as may be selected by the user. For example, bond group 74 may include issuers, such as issuers 72a, 72b, in a particular industry, e.g. banking, steel, automotive manufacture, oil drilling. Bond group 74 may include all bonds of a particular issuer, such as all Microsoft bonds (ticker symbol MSFT). Bond group 74 may include issuers, such as issuers 72a, 72b, in a particular locale, e.g. Japan, U.S., U.K. Bond group 74 may include issuers, such as issuers 72a, 72b, of bonds, such as bonds 71a, 71b, 71c, 71d, 71e, 71f, 71g, 71h, denominated in a particular currency, e.g. U.S. dollars, Euros, Japanese yen, Mexican pesos.

As illustrated in FIG. 1B, guide T includes guide bonds $T_1, T_2, T_3, T_4$ having various maturities. Guide T may be U.S. Treasury bonds represented for illustrative purposes by guide bonds $T_1, T_2, T_3, T_4$. Second guide T' includes second guide bonds $T_1', T_2', T_3', T_4', T_5'$. Second guide bonds $T_1', T_2', T_3', T_4', T_5'$ that comprise second guide T' may be, for example, bonds having a AAA rating by Standard and Poor's. The guide T and second guide T' provide standard(s) against which one or more bonds are analyzed, in various implementations. Guide bonds $T_1, T_2, T_3, T_4$ and second guide bonds $T_1', T_2', T_3', T_4', T_5'$ are illustrative, and there may be various numbers of such bonds in guide T and second guide T' in various implementations.

Figure 2:
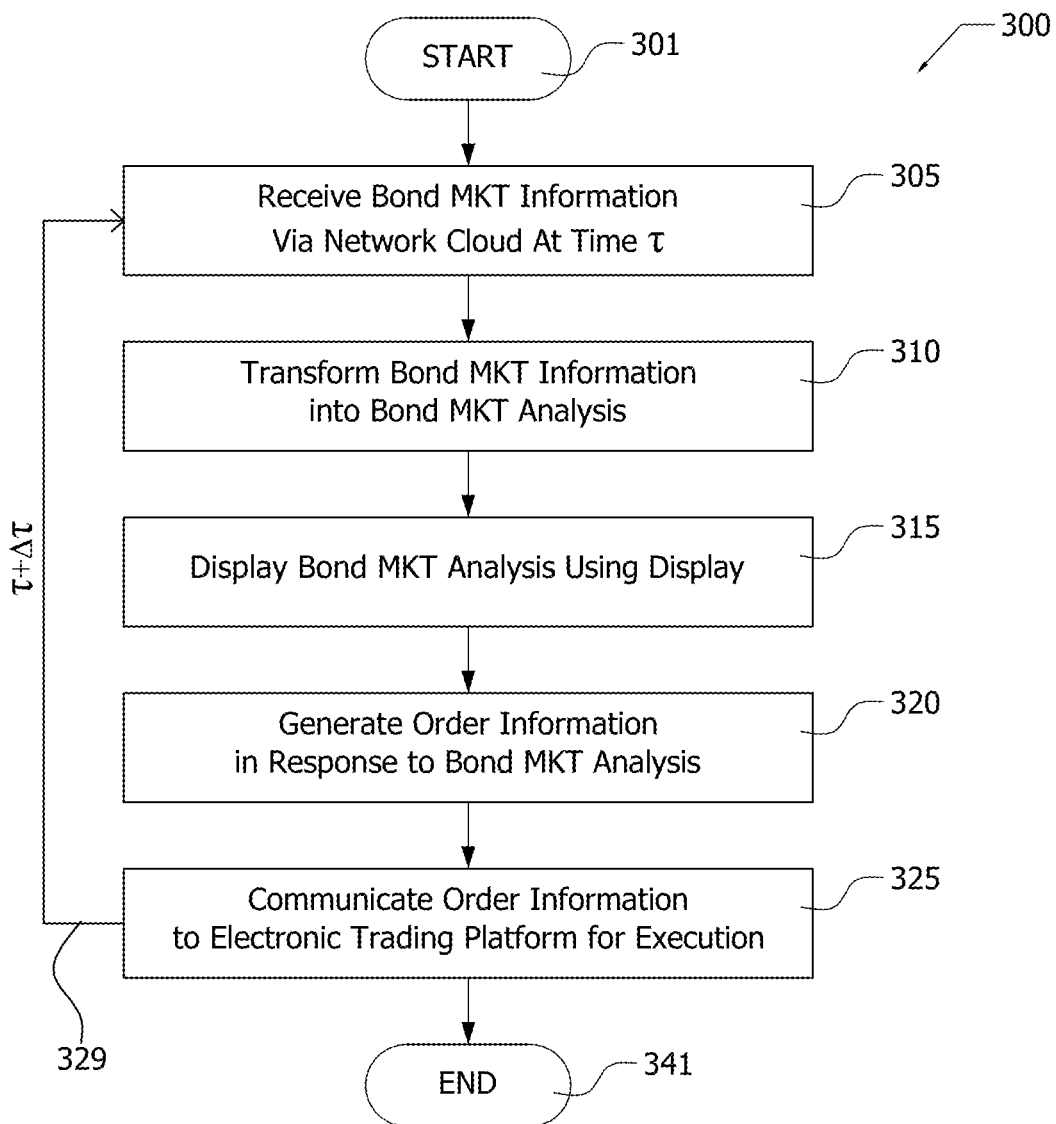
FIG. 2 illustrates by process flow chart an exemplary method as may be implemented by the exemplary bond information system of FIG. 1A.

For example, a bond information system, such as bond information system 10, may operate according to exemplary method 300 illustrated in FIG. 2. Thus, per method 300, a computer, such as computer 20 receives bond market information, such as bond market information 27, in digital form from various combinations of a trading computer of an electronic trading platform, such as trading computer 42 of electronic trading platform 12, and an information computer of an information source, such as information computer 45 of information source 15 and then transforms the bond market information into a bond market analysis, such as bond market analysis 28. Accordingly, the bond market information, which is generally disorganized digital information existing on one or more computers such as the trading computer and the information computer, is transmitted to the computer and then transformed by the computer into an organized bond market analysis, which is also in digital form, and may be displayed in various ways.

Method 300 is entered at step 301. At step 305, bond market information is received by the computer at time $\tau$ in digital form from various combinations of the trading computer of electronic trading platform and the information computer of the information source. The bond market information exists in digital form on various combinations of the trading computer of the electronic trading platform and the information computer of the information source. The bond market information may be communicated to the computer via a network cloud, such as network cloud 13.

At step 310, the bond market information, which exist in digital form, is transformed automatically in real time into the bond market analysis.

At step 315, the bond market analysis is displayed using a display, such as display 22.

At step 320, order information, such as order information 37, is generated in response to the bond market analysis, and the order information may be generated automatically by the computer.

At step 325, the order information is communicated to the trading computer of the electronic trading platform for execution via the network cloud, and the order information may be communicated automatically from the computer to the trading computer.

Method 300 may loop, for example, from step 325 to step 305 by loop 329 to update bond market information and, thus, bond market analysis, the display of bond market analysis, and order information generated in response to bond market information at time $\tau+\Delta\tau$.

Method 300 terminates at step 341.

Figure 3A:
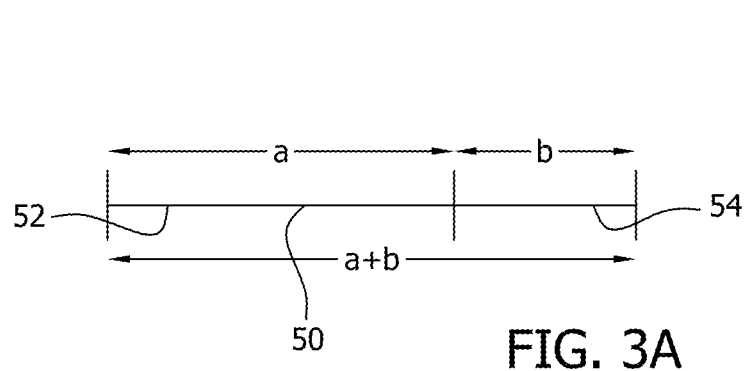
FIG. 3A illustrates by graphical representation certain mathematical relations as may be implemented by the exemplary bond information system of FIG. 1A.

Bond market analysis 28 may be derived, in part, using golden mean $\phi$. FIG. 3A illustrates line segment 50 having length a+b subdivided into line segment 52 having length a and line segment 54 having length b, respectively where a>b>0. Golden mean $\phi$ is then defined by the relation between line segments 50, 52, 54 according to:

$$\phi = \frac{a+b}{a} = \frac{a}{b} \quad (1)$$

so that:

$$\left(\frac{a}{b}\right)^2 - \left(\frac{a}{b}\right) - 1 = 0 \quad (2)$$

with solutions:

$$\frac{a}{b} = \frac{1}{2}(1 \pm \sqrt{5}) \quad (3)$$

Golden mean $\phi$ corresponds to the physical solution of equation (3) (i.e., the solution that gives positive lengths for a, b), so that golden mean $\phi$ is defined as:

$$\phi = \frac{a}{b} = \frac{1}{2}(1 + \sqrt{5}) = 1.6180 \quad (4a)$$

and the non-physical root $\xi$ of equation (3) is:

$$\xi = \frac{1}{2}(1 - \sqrt{5}) = -0.6180 \quad (4b)$$

Note that golden mean $\phi$ and non-physical root $\xi$ are related according to:

$$\xi = -1/\phi \quad (5)$$

Bond market analysis 28 may be derived, in part, using the Fibonacci sequence of Fibonacci numbers:

$$F = 0, 1, 1, 2, 3, 5, 8, 13, 21, 34 \quad (6)$$

The $n^{th}$ Fibonacci number $F_n$ of the Fibonacci sequence is generated by the recursion relation:

$$F_n = F_{n-1} + F_{n-2} \text{ where } F_0 = 0 \text{ and } F_1 = 1 \quad (7)$$

The recursion relation equation (7) can be expressed in matrix form as:

$$\begin{bmatrix} F_n \\ F_{n-1} \end{bmatrix} = \begin{bmatrix} 1 & 1 \\ 1 & 0 \end{bmatrix} \begin{bmatrix} F_{n-1} \\ F_{n-2} \end{bmatrix} = A \begin{bmatrix} F_{n-1} \\ F_{n-2} \end{bmatrix} \quad (8)$$

The eigenvalues $\lambda$ of matrix A are then found by solving:

$$|A - \lambda I| = 0 \quad (9)$$

where I is the identity matrix, which leads to:

$$\lambda^2 - \lambda - 1 = 0 \quad (10)$$

Note that equation (10) has the same form as equation (2) resulting is relationships between golden mean $\phi$ and eigenvalues $\lambda_1$, $\lambda_2$ of matrix A:

$$\lambda_1 = \phi = \frac{1}{2}(1 + \sqrt{5}) \quad (11a)$$

$$\lambda_2 = \xi = -\frac{1}{\phi} = \frac{1}{2}(1 - \sqrt{5}) \quad (11b)$$

The $n^{th}$ element of the Fibonacci sequence is expressed in terms of the eigenvalues as:

$$F_n = \frac{\lambda_1^n - \lambda_2^n}{\lambda_1 - \lambda_2} = \frac{\phi^n - \xi^n}{\phi - \xi} = \frac{\phi^n - \xi^n}{\sqrt{5}} \quad (12)$$

thereby connecting elements of the Fibonacci sequence $F_n$ with the golden mean $\phi$. The ratio of successive elements in the Fibonacci sequence is given by:

$$\frac{F_{n-1}}{F_n} = \frac{\phi^{n-1} - \xi^{n-1}}{\phi - \xi} \cdot \frac{\phi - \xi}{\phi^n - \xi^n} = \frac{\phi^{n-1} - \left(-\frac{1}{\phi}\right)^{n-1}}{\phi^n - \left(-\frac{1}{\phi}\right)^n} \to \frac{1}{\phi} \text{ as } n \to \infty \quad (13)$$

So that, as n→∞

$$\frac{F_{n-1}}{F_n} = \frac{1}{\phi} = 0.6180 \quad (14a)$$

Similarly, as n→∞

$$\frac{F_{n-2}}{F_n} = \frac{1}{\phi^2} = 0.3819 \quad (14b)$$

$$\frac{F_{n-3}}{F_n} = \frac{1}{\phi^3} = 0.2360 \quad (14c)$$

$$\frac{F_{n-4}}{F_n} = \frac{1}{\phi^4} = 0.1458 \quad (14d)$$

that may be generalized to:

$$\frac{F_{n-k}}{F_n} = \frac{1}{\phi^k} \text{ as } n \to \infty \text{ for } k = 1, 2, 3 \quad (14e)$$

Bond market analysis 28 is then calculated, at least in part, using one or more Fibonacci numbers and/or ratios of Fibonacci numbers expressed in terms of the golden mean $\phi$. In general, bond market analysis 28 may be expressed as function $f$ where:

$$Y = T + f(r, t, \phi) \quad (15)$$

Where Y is the yield (at par) of a bond and T is the yield (at par) of a guide T against which the bond is analyzed such as, for example, U.S. Treasury bonds. The bond being analyzed has risk r and maturity t. Per equation (15), yield Y increases in relation to guide T as a function $f$ of risk and maturity and, for example, one or more Fibonacci numbers and/or ratios of Fibonacci numbers expressed in terms of golden mean $\phi$.

For example, spread S and yield Y with respect to guide T (e.g., where T is the U.S. Treasury bond yield) may be calculated according to:

$$Y = T + S \text{ where } S = f(r, t, \phi) = (B + mt)R^{r-1} \quad (16)$$

Y (yield)=yield in percent at par (e.g., price=100). Note that yield Y and coupon C are equal at par.

S (spread)=the spread from guide Tin percent.

B (base)=indicative of the spread between guide T and second guide T' and represents a compensation for risk between asset classes. For example, base B is indicative of the spread in yield between U.S. Treasury bonds at 1 year as guide T and AAA corporate bonds at one year as second guide T'. In some implementations, base B may be user specified and received as input by computer 20. In such implementations, base B represents the user's estimate of compensation for risk between asset classes and may not be calculated deterministically, for example, from guide T and second guide T'. Thus, in such implementations, spread S calculated from user estimated base B is independent of guide T and may be applied to any guide T. m (slope)=the slope of guide T, e.g., U.S. Treasury bond 2 yr/10 yr yield curve spread/100, slope m may be set at 1 bp to 50 y when the U.S. Treasury bond yield curve inverts in order to maintain a positive slope m.

t=maturity (years).

$$R(\text{multiplier}) = 1 + \frac{F_{n-3}}{F_n} \text{ as } n \to \infty = \quad (17)$$

$$1 + \frac{1}{\phi^3} = |2\xi| = -1 + \sqrt{5} = 1.2360 \ldots \text{ . In general}$$

$$R = 1 + \frac{F_{n-k}}{F_n} \text{ as } n \to \infty = 1 + \frac{1}{\phi^k}$$

so that R includes a ratio of Fibonacci numbers expressed using the golden mean $\phi$; and, r (risk)=related to the bond rating where, for example, r=1 for AAA, r=2 for AA+, r=3 for AA, etc.—see Table I. Note that risk r may assume fractional values, in certain implementations (Cf. exemplary method 700). Further note that, although the Standard & Poor's rating system and S&P rating are generally used in this disclosure for explanatory purposes, Moody's, Fitch's, or other rating(s) or combination of rating(s) including rating(s) input by the user may be used in various implementations.

TABLE I

| Moody's/S&P Rating | Risk r |
|---|---|
| AAA/AAA | 1 |
| Aa1/AA+ | 2 |
| Aa2/AA | 3 |
| Aa3/AA− | 4 |
| A1/A+ | 5 |
| A2/A | 6 |
| A3/A− | 7 |
| Baa1/BBB+ | 8 |
| Baa2/BBB | 9 |
| Baa3/BBB− | 10 |
| Ba1/BB+ | 11 |
| Ba2/BB | 12 |
| Ba3/BB− | 13 |
| B1/B+ | 14 |
| B2/B | 15 |
| B3/B− | 16 |
| Caa1/CCC+ | 17 |
| Caa2/CCC | 18 |
| Caa3/CCC | 19 |
| Distressed | Distressed |

Equation (16) results in a linear relationship between spread S and maturity t:

$$S = BR^{r-1} + mR^{r-1}t \quad (18a)$$

For example, when risk r=1 (corresponds for example to AAA rated corporate bond) get:

$$S = B + mt \quad (18b)$$

so that spread S has the same slope m as the U.S. Treasury bond 2 yr/10 yr yield curve spread/100 offset by base B. Have a linear relationship between spread S and maturity t. When risk r=2 (corresponds for example to AA+ rated corporate bond) get:

$$S = (B + mt)R \quad (18c)$$

so that spread Shas slope m increased by R and is offset by BR.

When risk r=3 (corresponds to AA rated corporate bond, for example) get:

$$S = BR^2 + mR^2 t \quad (18d)$$

so that spread S has slope m increased by $R^2$ and offset of $BR^2$. Accordingly, using equation (16) as a model, as the corporate bond rating decreases, the risk r increases and the offset, which corresponds to compensation for risk, from the 1 yr U.S. Treasury bond increases by $R^{r-1}$ and the slope with respect to US Treasury bond 2 yr/10 yr yield curve increases by $R^{r-1}$.

Figure 3B:
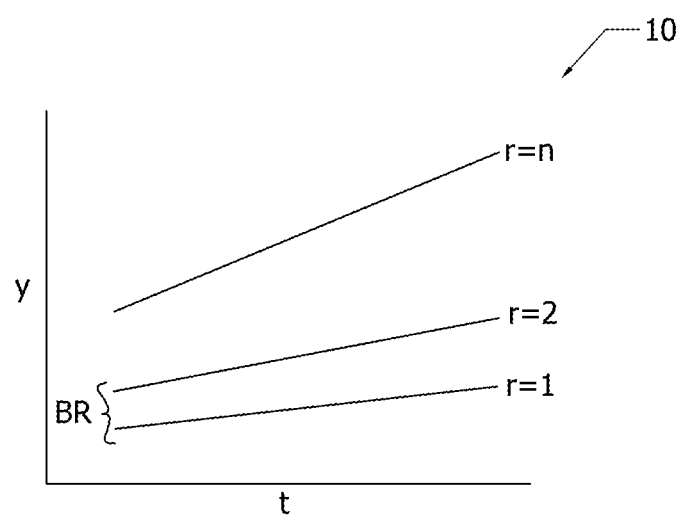
FIG. 3B illustrates by graphical representation certain mathematical relations as may be implemented by the exemplary bond information system of FIG. 1A.
Figure 3C:
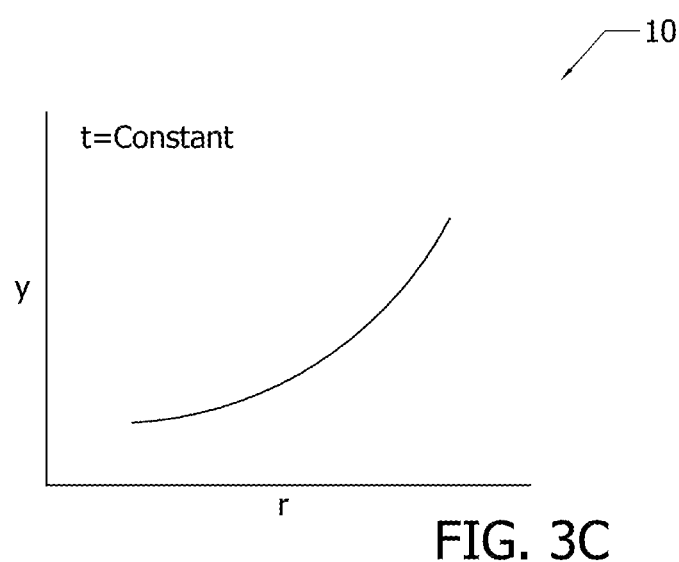
FIG. 3C illustrates by graphical representation certain mathematical relations as may be implemented by the exemplary bond information system of FIG. 1A.

FIG. 3B illustrates yield Y as a function of maturity t for risk r=1, r=2, r=n where n>2. Note that yield Y increases linearly with time, and slope increases exponentially as risk r increases, as indicated in FIG. 3B. FIG. 3C illustrates yield Y as a function of risk r for a fixed maturity t thereby elucidating the exponential relationship between yield Y and risk r.

A limit yield $Y_\ell$ and limit spread $S_\ell$ based on guide T may be calculated, for example, according to:

$$Y\ell = T + S\ell \text{ where } S\ell = 1/2(B+mt)R^{r-1} \quad (19)$$

While the discussion generally within this disclosure including definitions of base B and slope m and equations (16), (19) as well as Examples 1, 2 that follow may be directed to bond market analysis 28 of U.S. corporate bonds with respect to U.S. Treasury bonds for purposes of explanation, it should be recognized that the methods, apparatus, and compositions of matter disclosed herein are applicable to bonds in general. Accordingly, for example, the spread S, yield Y, limit spread Sp, and limit yield Ye may be determined using equations (16), (19) with guide T, second guide T', base B, and slope m defined in terms of various bonds and combinations of bonds, such as Eurobonds, U.K gilts, LIBOR rates, bonds denominated in various currencies, sovereign bonds, corporate bond(s), bond indices (e.g., Merrill Lynch Global Bond Index, Merrill Lynch Domestic Master, Bloomberg Barclays U.S. Treasury Index, J.P. Morgan Emerging Markets Bond Index, Bear Stearns High-Yield Index), exchange traded funds (ETF), closed end funds, and combinations thereof, as would be readily recognized by those of ordinary skill in the art upon study of this disclosure.

A bond, such as bond 71a, 71b, 71c, 71d, 71e, 71f, 71g, 71h, trading at other than par may be adjusted to par according to:

$$C = C(t, Y) \quad (20)$$

using maturity t and yield Y corresponding to maturity t and rating r of the bond to give coupon yield C. Yield Y as used in equation 20 is determined from equation 16 for maturity t and rating r. Function C(t, Y) is readily recognized by those of ordinary skill in the art upon study of this disclosure.

In order to determine a bid price $P_B$ of the bond, such as bond 71a, 71b, 71c, 71d, 71e, 71f, 71g, 71h, the coupon yield C is adjusted based on the difference between coupon yield C and yield Y following adjustment to par using equation (20). If coupon yield C>Y then the coupon yield C is a premium. The coupon yield C is then increased to give bid coupon yield $C_B$ in basis points, for example, according to:

$$C_B = C + (C-Y)20/100 \quad (21)$$

If coupon yield C<Y then coupon yield C is then decreased to give bid coupon yield $C_B$ in basis points, for example, according to:

$$C_B = C + (C-Y)5/100 \quad (22)$$

Following adjustment of coupon C using either equation (21) or equation (22) to bid coupon yield $C_B$, bid price $P_B$ of the bond is calculated as a function of the bid coupon yield $C_B$ according to:

$$P_B = P_B(C_B) \quad (23)$$

In order to generate an ask price $P_A$, the coupon yield C is adjusted based on the difference between coupon yield C and yield Y. If coupon yield C>Y then coupon yield C is then increased to give ask coupon yield $C_A$, for example, according to:

$$C_A = C + (C-Y)10/100 \quad (24)$$

If coupon yield C<Y then coupon yield C is then decreased to give ask coupon yield $C_A$, for example, according to:

$$C_A = C + (C-Y)15/100 \quad (25)$$

Following adjustment of coupon C using either equation (24) or equation (25), ask price $P_A$ of the bond is calculated as a function of the ask coupon yield $C_A$ according to:

$$P_A = P_A(C_A) \quad (26)$$

Note that fractional values 20/100, 5/100 in equations (21), (22), respectively, and fractional values 10/100, 15/100 in equations (24), (25), respectively, are exemplary for purposes of explanation only, and other fractional values may be used in equations (21), (22), (24), (25), in various implementations. The fractional values used in equations (21), (22), (24), (25) may be input by the user, in various implementations.

Figure 4:
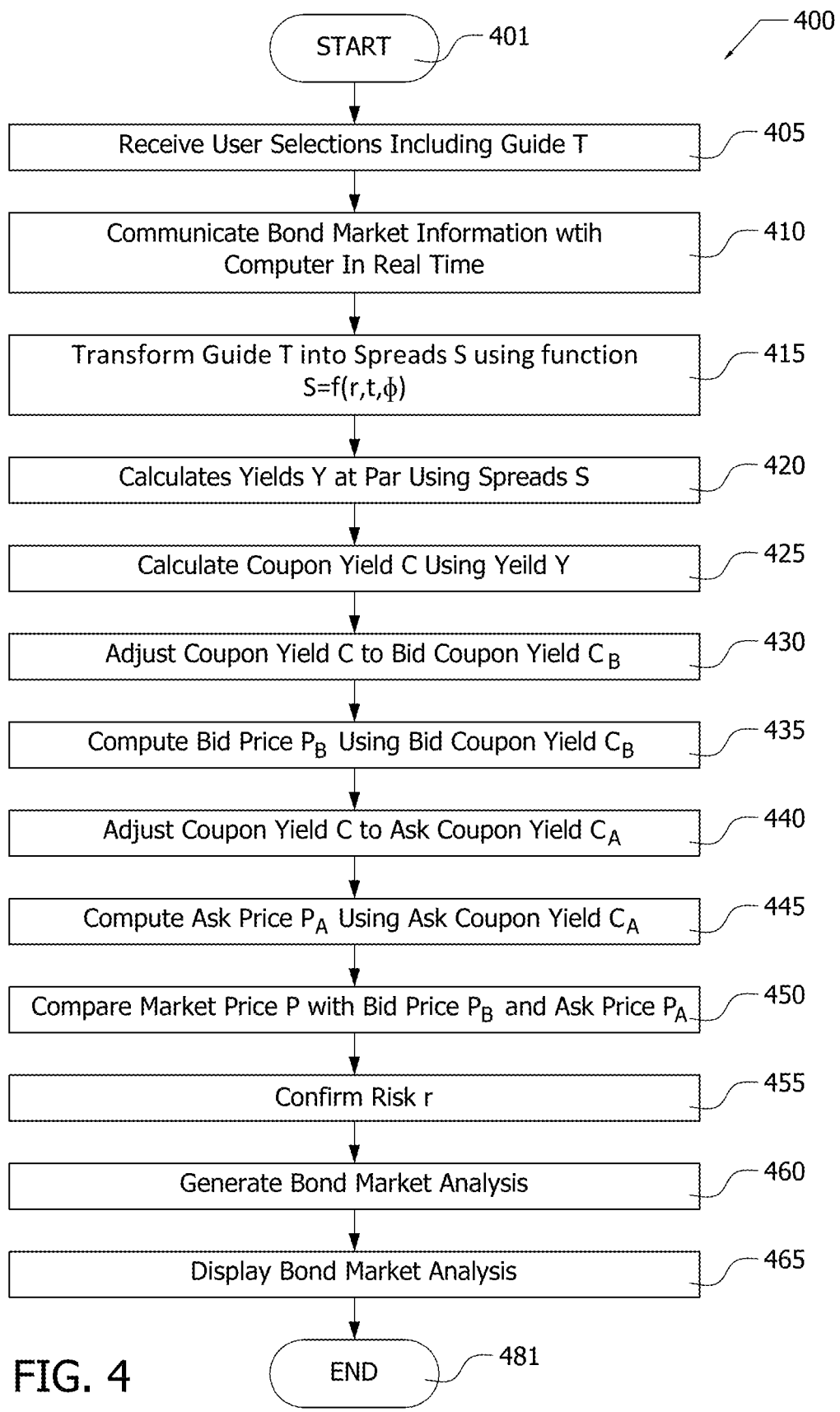
FIG. 4 illustrates by process flow chart a second exemplary method as may be implemented by the exemplary bond information system of FIG. 1A.

FIG. 4 illustrates exemplary method 400 for transforming bond market information, such as bond market information 27, automatically in real time into bond market analysis, such as bond market analysis 28 in response to trading occurring on an electronic trading platform, such as electronic trading platform 12 using a bond information system, such as bond information system 10. The bond market analysis is displayed in real time. As illustrated in FIG. 4, method 400 is entered at step 401.

At step 405, a computer, such as computer 20, of a bond information system, such as bond information system 10, receives a user selection that includes a guide T. The guide T includes one or more guide bonds, such as guide bonds $T_1$, $T_2$, $T_3$, $T_4$. Step 405 may include receiving a user selection of a bond group, such as bond group 74, and step 405 may include receiving a user selection of a second guide T'. A user selection of base B may be received at step 405. Other parameters including parameters selected by the user as may be used in generating the bond market analysis may be received by the computer at step 405.

At step 410, bond market information, such as bond market information 27, is communicated with the computer in real time. The bond market information may be communicated from various combinations of an electronic trading platform, such as electronic trading platform 12, and an information source, such as information source 15. The bond market information may be communicated via a network cloud, such as network cloud 13. The bond market information may include market prices P of the one or more guide bonds of the guide T from trading occurring on the electronic trading platform updated as trading occurs on the electronic trading platform.

At step 415, the guide T' is transformed into one or more spreads S' using the bond market information, each spread S=f(r, t, φ) being a function f of golden mean φ and the function f of risk r and maturity 1. At step 415, spread S is calculated from guide T (e.g., US Treasury bond maturity curve) for a bond at par (e.g., 100% of notational principal)). Spread S may reflect the added yield necessary with respect to guide T for fair compensation for risk r. Base B and slope m as used, for example, in equation (16) in performing step 415 as defined subjectively by the user may be received by the computer at step 415. Note that spreads S' are neither a buy nor a sell indication, only a yield representation at par for a specific maturity and risk.

At step 420, yields Y at par are calculated using spreads S for bonds, such as bonds 71a, 71b, 71c, 71d, 71e, 71f, 71g, 71h, that are secondary issues trading at other than par. The bonds may be selected in response to user selections received at step 405. Yield Y is calculated by adding spread S' to guide T (e.g., add spread S to current US Treasury "on the run" and add spread S to interpolated "off the run" 4 yr, 6 yr, 8 yr, 9 yr, 11-19 yr, 21-29 yr US Treasury). The spread S used to calculate yield Y corresponds to the risk r and maturity/for each bond. The bond market information, in part, being indicative of risk r and maturity/of each bond of the bond group and may be updated in response to changes in risk r and maturity t of any bond of the bond group.

At step 425, the coupon yield C at par for corresponding yield Y is calculated for each bond.

At step 430, coupon yield C for each bond is adjusted to bid coupon yield $C_B$.

At step 435, bid price $P_B$ for each bond of the bond group is computed using the corresponding bid coupon yield $C_B$.

At step 440, coupon yield C for each bond of the bond group is adjusted to ask coupon yield $C_A$.

At step 445, ask price $P_A$ for each bond of the bond group is computed using the corresponding ask coupon yield $C_A$.

At step 450, market price P is compared with bid price $P_B$ and ask price $P_A$. When bid price $P_B$ and ask price $P_A$ are compared to current market price P, the result is a rich-cheap analytic. For example, +20,000 visible CUSIP driven markets may be scanned in under 30 seconds.

At step 455, the risk r of each bond may be confirmed, for example, using credit default swaps, fundamental analysis, or using goal seeking algorithms using market information.

At step 460, the bond market analysis is generated. The bond market analysis may variously include spread S, yield Y, bid price $P_B$, ask price $P_A$, market price P, risk r, and maturity t organized in various ways, for example, as disclosed herein. For example, bonds having market price P below bid price $P_B$ may be highlighted using the display as a "buy". Bonds having market price P above ask price $P_A$ may be highlighted using the display as a "sell", for example.

At step 465, the bond market analysis is displayed using a display, such as display 22.

Method 400 terminates at step 481. Exemplary method 400 may cycle automatically to update continuously the bond market analysis and the display of the bond market analysis without human intervention in response to trading occurring on the electronic trading platform.

Example 1

Consider an exemplary 10 yr bond in hypothetical XYZ Corp. with various coupons priced to same yield at maturity.

TABLE II

| Coupon | Maturity | Price | Yield to Maturity |
|---|---|---|---|
| 6.00% | 10 yr | 116.351 | 4.00% |
| 4.00% | 10 yr | 100.000 | 4.00% |
| 2.00% | 10 yr | 83.649 | 4.00% |

A $100,000 purchase of the XYZ bond buys more principal at a discount or less principle at a premium, as indicated in Table II. The result is more net cash at a discount and less net cash at a premium, as illustrated in Table III.

TABLE III

| Coupon | Maturity | Interest | Principal | Net Cash |
|---|---|---|---|---|
| 6.00% | 10 yr | $51.567.91 | $85,946.51 | $137,514.42 |
| 4.00% | 10 yr | $40,000.00 | $100,000.00 | $140,000.00 |
| 2.00% | 10 yr | $23,909.56 | $119,547.77 | $143,457.33 |

In order to have the same net cash return, there must be price adjustments on principal, as indicated in Tables IV, V.

TABLE IV

| Coupon | Maturity | Price | Yield to Maturity |
|---|---|---|---|
| 6.00% | 10 yr | 114.285 | 4.233% |
| 4.00% | 10 yr | 100.000 | 4.00% |
| 2.00% | 10 yr | 85.714 | 3.724% |

TABLE V

| Coupon | Maturity | Interest | Principal | Net Cash |
|---|---|---|---|---|
| 6.00% | 10 yr | $52,500.15 | $87,500.25 | $140,000.40 |
| 4.00% | 10 yr | $40,000.00 | $100,000.00 | $140,000.00 |
| 2.00% | 10 yr | $23,333.33 | $116,666.67 | $140,000.00 |

Thus, in Example 1, in order to equate the net cash, premium bonds receive a discount paid for yield in order to buy less principal. The discount, in this Example, is 012% per 100 bp differential in coupon which equates to 0.23%. Discount bond receive a premium paid for yield in order to buy more principal. In this Example, the premium is-0.14% per 100 bp differential in coupon which equates to −0.28%. Thus, Example 1 demonstrates the rationale underlying equations (21), (22), (24), (25).

Example 2

Example 2 illustrates exemplary methods of use of a bond information system, such as bond information system 10, to price a bond group, such as bond group 74, at par. In this Example, the bond group is selected as U.S. corporate bonds that are then to be priced at par using U.S. Treasury bonds as guide T. The bond group in Example 2 includes bonds having risk r ranging from highest credit quality (AAA with risk r=1) to distressed (risk r=20).

Equation (16) is used to determine spread S and yield Y, and equation (19) is used to determine limit spread $S_\ell$ and limit yield $Y_\ell$ in Example 2. Spread S and yield Y may be indicative of fair market price, and limit spread $S_\ell$ and limit yield $Y_\ell$ may be indicative of pricings that are non-conforming with respect to fair market price. For example, there may be inadequate compensation for risk beyond the limit spread $S_\ell$ and the limit yield $Y_\ell$.

Figure 5:
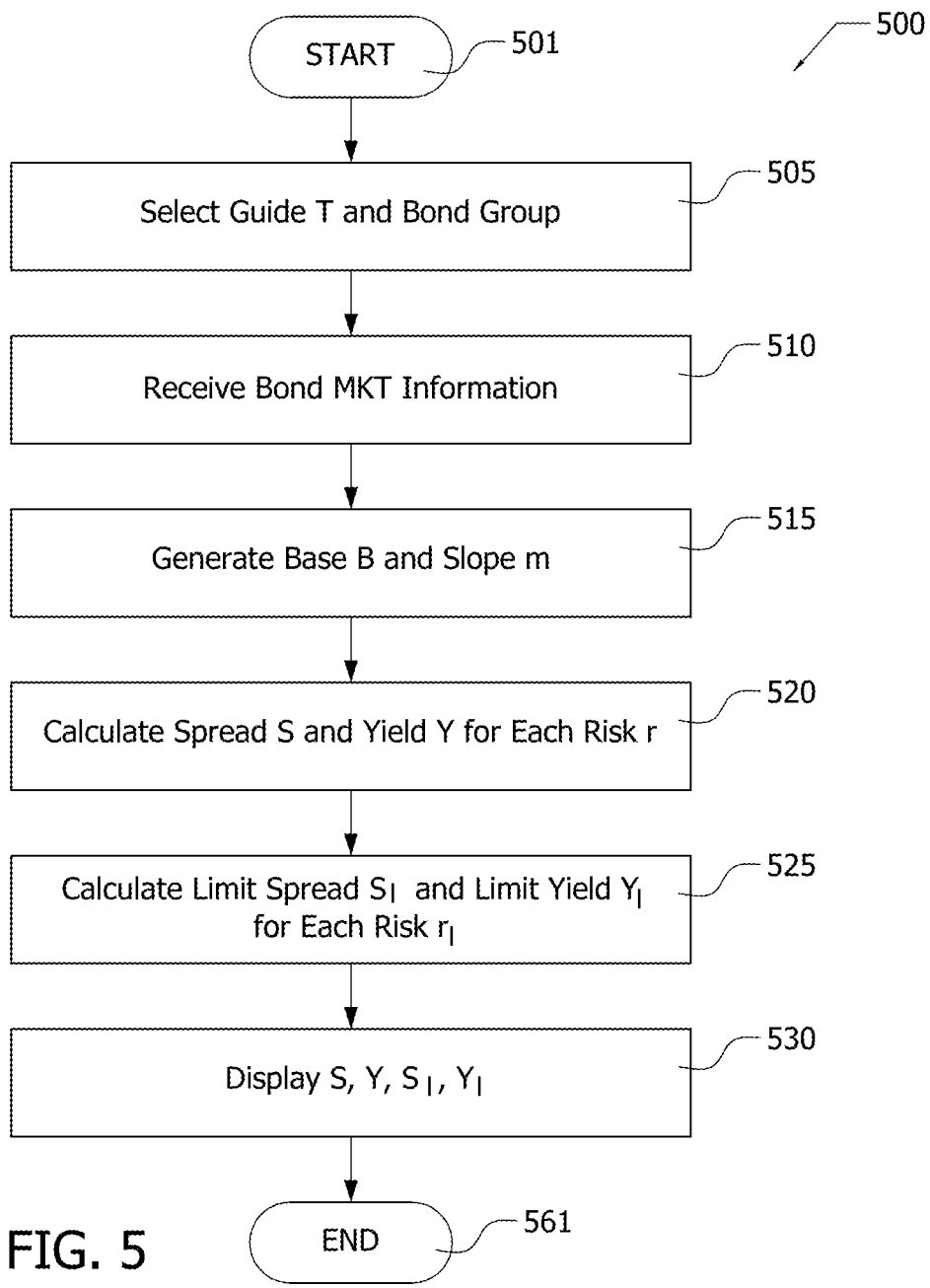
FIG. 5 illustrates by process flow chart a third exemplary method as may be implemented by the exemplary bond information system of FIG. 1A.

Exemplary method 500 of using the bond information system to price the bond group of bonds at par in Example 2 is illustrated in FIG. 5. As illustrated in FIG. 5, method 500 is entered at step 501.

At step 505, a user selects a bond group and a guide T for analysis by the bond information system using a computer, such as computer 20. In this Example, U.S. corporate bonds are selected as the bond group and U.S. Treasury bonds are selected as guide T.

At step 510, bond market information, such as bond market information 27, is received by the computer via a network cloud, such as network cloud 13. The bond market information so communicated may be selected by the bond information system in response to the bond group selected at step 505 and the guide T selected at step 510. The bond market information may be communicated, at least in part, from one or more electronic trading platforms, such as electronic trading platform 12, and/or from one or more information sources, such as information source 15.

At step 515, the base B and slope m are generated. The user may input base B and slope m at step 515 thereby generating base B and slope m. Alternatively, at step 515, the bond information system may determine base B and/or slope m, at least in part, by computation using the bond market information.

At step 520, the yield Y and buy spread S with respect to guide T are calculated by the computer according to equation (16) for each risk r of bonds in the bond group selected at step 505. The base B and slope m from step 515 are used in equation (16) at step 520.

At step 525, the limit spread $S_\ell$ and limit yield $Y_\ell$ with respect to guide T are calculated by the computer according to equation (19) for risks r found in the bond group selected at step 505. The base B and slope m from step 515 are used in equation (19) at step 525.

At step 530, the computer displays an image, such as image 25, on a display, such as display 22. The image is indicative of a bond market analysis, such as bond market analysis 28, of the bond group selected for analysis at step 505. The bond market analysis may include the spread S, yield Y, limit spread $S_\ell$, limit yield $Y_\ell$ calculated at steps 520, 525, respectively, for risks r of bonds within the bond group.

Method 500 may loop to update the bond market analysis in response to changes in bond market information, in response to changes in guide T, base B, or slope m as may be input by the user. Method 500 terminates at step 561, as illustrated.

The resulting bond market analysis 28 is presented in Table VI illustrated in FIG. 6, Table VII illustrated in FIG. 7, Table VIII illustrated in FIG. 8, and Table IX in FIG. 9. Table VI includes spreads S, Table VII includes yields Y, Table VIII includes limit yields $Y_\ell$, and Table IX combines yields Y and limit yields $Y_\ell$. The yields Y and limit yields $Y_\ell$ are calculated using T as U.S. Treasury bond yields. In this example, U.S. Treasury bond yields for the 2 year, 3 year, 5 year, 7 year, 10 year, 20 year, 30 year U.S. Treasury bonds are at market and U.S. Treasury bond yields at intervening years (e.g. 4 years, 6 years, 8 years . . . ) are determined by interpolation.

As illustrated in FIG. 7, portions of Table VII are colored in colors 61a, 61b, 61c, 61d that indicate investment grade, speculative, junk, and distressed, respectively. Colors 61a, 61b, 61c, 61d may be non-white, and may be selected to allow the user to differentiate portions of Table VII while allowing the user to read values in Table VII. The user may highlight a selected portion of Table VII with color 61e in order to enhance viewing of the portion of Table VII so selected. Tables VI, VIII, IX are similarly highlighted as illustrated in FIGS. 6, 8, 9. Exemplary colors 61a, 61b, 61c, 61d may be, for example, green, orange, brown, red, yellow, respectively. Certain portions of Table VII may be black and white.

According to Tables VI, for example, a corporate bond with a BB+ rating and a 30 year maturity requires spread S of 3.38% from the 30 year U.S. Treasury to compensate for the added risk of the BB+ bond over the U.S. Treasury bond. According to Table VII the 30 year BB+ bond is fairly priced for risk at a yield Y of about 6.19% at par (coupon yield C=6.19%), and is indicated as non-conforming for yields than about limit yield $Y_\ell$ of 5.35% per Table VIII. A yield generally between 5.35% and 6.19% may be fairly pricing risk, per this example.

A user may use the yields Y to select a maturity t and risk r to achieve a specified yield Y. For example, per Table VII, a yield at par of 3.06% can be obtained with a bond having a maturity of 10 years and an AA+ rating or a generally equivalent yield at par of 3.08% can be obtained with a bond having a maturity of 2 years and a BBB rating.

Example 3

Example 3 illustrates methods of use of a bond information system, such as bond information system 10, to price a bond group, such as bond group 74, that includes bonds, such as bonds 71a, 71b, 71c, 71d, 71e, 71f, 71g, 71h, trading at other than par in one or more electronic trading platforms, such as electronic trading platform 12. In Example 2, the bond group includes U.S. corporate bonds in the oil drilling sector that are then priced using equations (16), (20) to (26) with U.S. Treasury bonds as guide T. Exemplary method 600 of using the bond information system to price the bonds of the bond group in Example 2 is illustrated in FIG. 10.

Figure 10:
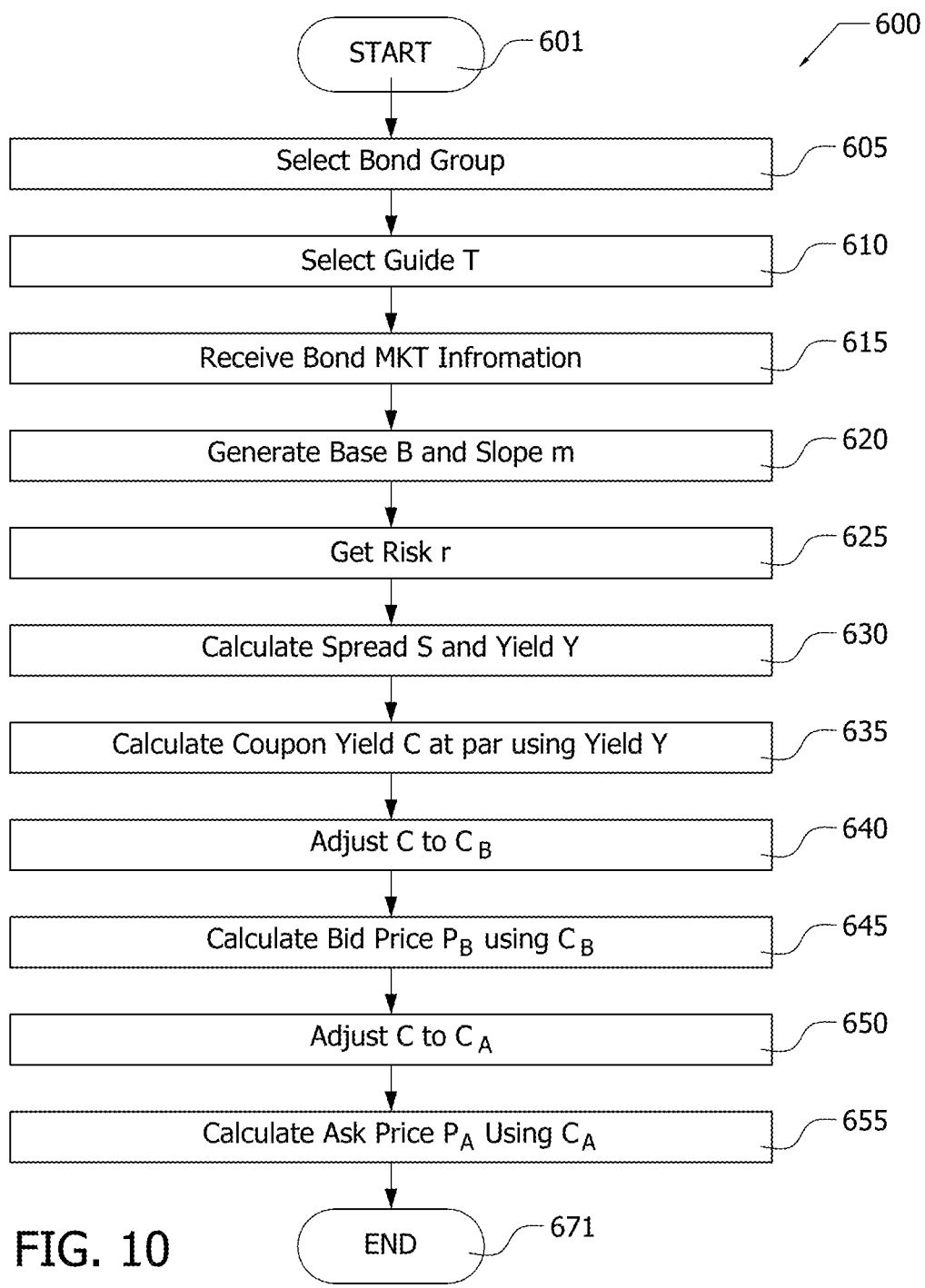
FIG. 10 illustrates by process flow chart a fourth exemplary method as may be implemented by the exemplary bond information system of FIG. 1A.

As illustrated in FIG. 10, method 600 is entered at step 601.

At step 605, the user selects the bond group. In this Example, U.S. corporate bonds in the oil drilling sector are selected as the bond group using a computer, such as computer 20.

At step 610, the user selects guide T using the computer. In this Example, U.S. Treasury bonds are selected as guide T.

At step 615, bond market information, such as bond market information 27, is received by the computer by communication via a network cloud, such as network cloud 13. The bond market information so communicated may be selected by the bond information system in response to the bond group selected at step 605 and the guide T selected at step 610.

At step 620, the base B and slope m are generated. The base B and slope m may be generated by user inputs. Alternatively, the bond information system may generate base B and/or slope m, at least in part, by calculation using the market data including second guide T'.

At step 625, the risk r is determined for each bond of the bond group. For example, risk r for each bond may be determined either from bond rating or from Credit Default Swaps (CDS's). The bond ratings and CDS data may be included in the bond market information communicated at step 615.

At step 630, the spread S and yield Y is calculated using equation (16) for each bond of the bond group using the maturity/and risk r of each bond and the guide 7 selected at step 610.

At step 635, the coupon yield C at par for corresponding yield Y is calculated for each bond of the bond group using equation (20).

At step 640, coupon yield C for each bond of the bond group is adjusted to bid coupon yield $C_B$ using either equations (21), (22).

At step 645, bid price $P_B$ for each bond of the bond group is calculated with equation (23) using bid coupon yield $C_B$.

At step 650, coupon yield C for each bond of the bond group is adjusted to ask coupon yield $C_A$ using either equations (24), (25).

At step 655, ask price $P_A$ is calculated for each bond of the bond group with equation (26) using ask coupon yield $C_A$.

Method 600 terminates at step 671, as illustrated in FIG. 10.

Bond market analysis 28 for the bond group that includes bonds in the oil drilling sector is presented in Table X illustrated in FIG. 11. Bonds are listed by ticker symbol in column 4, by coupon yield in column 5, and by maturity t (given as a date) in column 6. The spread B from guide T (e.g., U.S. Treasury bonds) is listed in column 2 and the coupon yield C of the corporate bond at par as calculated using equation (20) is listed in column 3. Prices P at last trade(s) are listed in columns 11, 12. Note that price, such as price in column 8, 9, 11, and yield, such as yield in column 7, 10, 12 are quantitatively essentially the same because price may be converted into yield and vice versa, as would be readily recognized by those of ordinary skill in in the art upon study of this disclosure, so that price and yield may be used interchangeably in this disclosure. Accordingly, price, as used herein, may refer to price or may refer to yield. For example, a price of 97.78 corresponds to a yield of 7.49% for a maturity of Sep. 15, 2020 (NBR—Nabors Industries). Rating(s) are given in column 14 and risk r' derived from rating(s) in column 15. Risk r used in equation (16) is listed in column 1 as derived either from bond rating or using Credit Default Swaps (CDS's).

Figure 12:
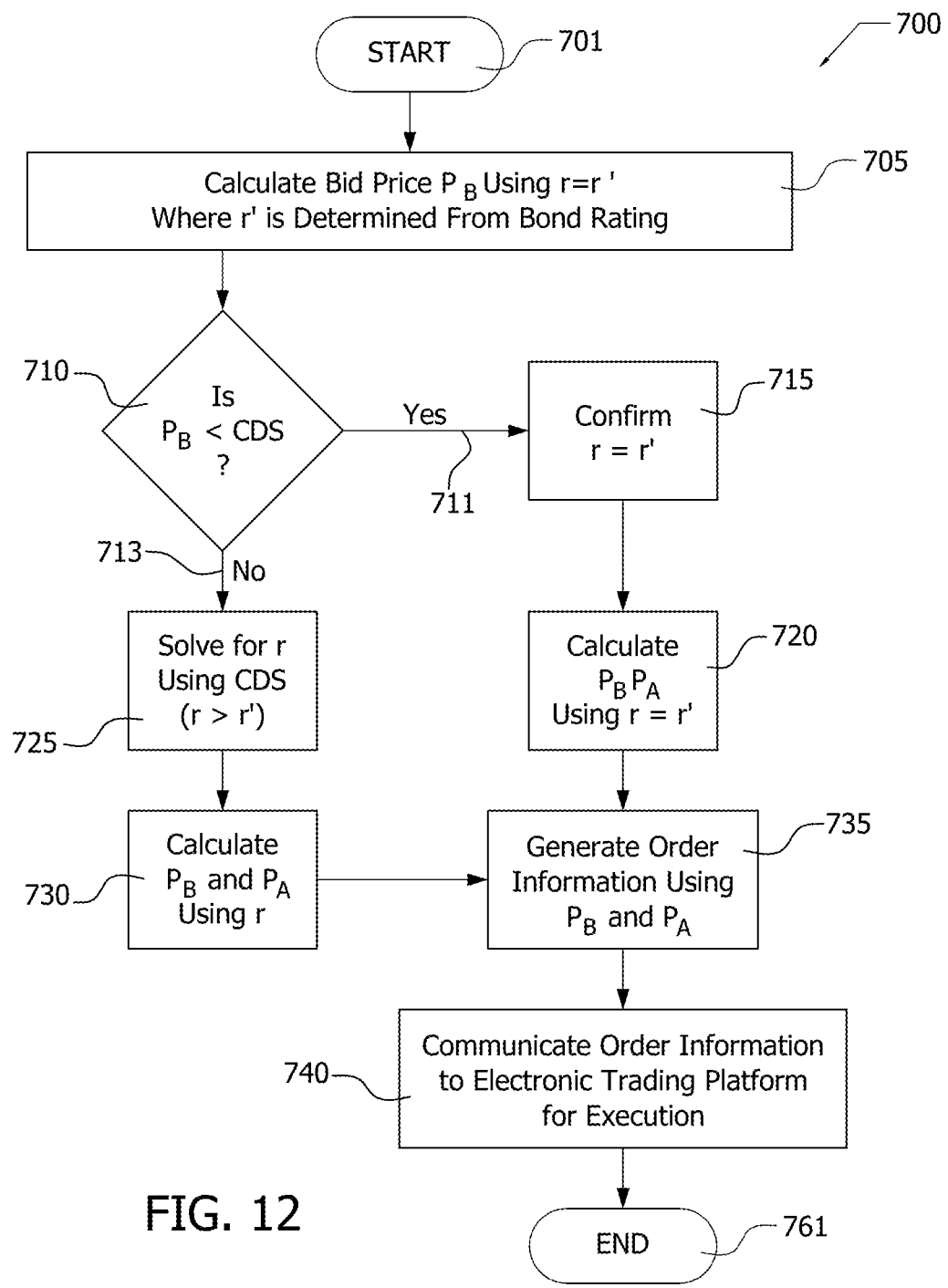
FIG. 12 illustrates by process flow chart a fifth exemplary method as may be implemented by the exemplary bond information system of FIG. 1A; and, FIG. 13 illustrates by process flow chart a sixth exemplary method as may be implemented by the exemplary bond information system of FIG. 1A.

Risk r may be adjusted from risk implied by the bond rating, for example, using one or more CDS spread according to exemplary method 700, which is illustrated in FIG. 12. Method 700 is entered at step 701.

At step 705, bid price $P_B$ is calculated for a bond of an issuer that has a corresponding CDS. Ask price $P_A$ is calculated, for example, according to method 600 using r=r' where r' is determined from the bond rating.

At step 710, the bid price $P_B$ is compared with the corresponding CDS. Is bid price $P_B$ less than the CDS? If yes, method 700 branches from step 710 along branch 711 to step 720. If the bond is cheaper than the corresponding CDS, it is considered value as being insurable by CDS.

At step 715, r is confirmed as being r' determined from the bond rating. Risk r is then set to r' (i.e. r=r').

At step 720, bid prices $P_B$ and ask prices $P_A$ for bonds of the issuer are calculated using r=r'.

If bid price $P_B$ is greater than the CDS at step 710, method 700 branches from step 710 along branch 713 to step 725. This indicates that using risk r=r' is inadequate. Risk r should be increased.

At step 725, the risk r is solved for using the CDS. Note that r may have a fractional value, for example, as in column 1 of Table X in FIG. 11.

At step 730, use risk r from step 725 to calculate bid price $P_B$ and ask price $P_A$ for bonds of the issuer.

At step 735, which is reached from either step 720 or step 730 order information, such as order information 37, is generated using bid prices $P_B$ and ask prices $P_A$ for bonds of the issuer.

At step 740, the order information is communicated via a network cloud, such as network cloud 13, to an electronic trading platform, such as electronic trading platform 12, for execution.

Method 700 terminates at step 761, as illustrated.

Another check for risk r is Risk Free Rate of Return: (RFR)=GDP+PCE (growth+inflation). RFR+200 bp computes base rate 30 yr investment grade (BBB−); RFR+500 bp equates base high yield at 30 yr "B+". RFR may be used in periods of Fed stimulus or market free fall when Treasuries disconnect. For example, current U.S. Treasury 30 yr has negative return to RFR (−1.2%) reflecting inordinate current demand for carry. Nevertheless, the check works for secondary markets to adjust base B.

Risk r may be derived from bond market information 27 such as net tangible assets, leverage, coverage, and so forth of the issuer, such as issuer 72a, 72b, as would be readily recognized by those of ordinary skill in the art upon study of this disclosure. If fundamentals are better than service rating, then use service rating in formula. If fundamentals are less than rating, then use lower indicated rating (highest numeric). For Bank/Finance shift three, one full letter grade less than industrials. Insurance do not shift, optional.

Bid prices $P_B$ in columns 7, 8 are determined as per steps 640, 645 of exemplary method 600, and ask prices $P_A$ in columns 9, 10 are determined as per steps 650, 655 of exemplary method 600. Risk r as listed in column 1 is used to determine Column 13 lists deviations of the last trade (col. 11) from bid price $P_B$. Positive values in column 13 indicate price P below bid price $P_B$, while negative values denoted by being enclosed within brackets ( ) indicate price P above bid price $P_B$. Such negative values may be highlighted, for example, in red.

A user may then evaluate a specific corporate bond or all corporate bonds in the oil drilling sector (the bond group) using Table V. Buys of the specific corporate bond should be at or below the bid and sales of the specific corporate bond should be at or above the ask. Trades between the bid and ask are considered at fair market. Deviations from fair market may be highlighted. For example, the last sale of NBR (Nabors Industries) Jan. 15, 2024 was at 56.00 (yield of 15.09%) below the fair market bid price $P_B$ of 72.86 by 16.86. In contrast, the last sale of NE (Nobel Corp.) Aug. 1, 2040 was at 40.000, which is above the fair market ask of 30.23 by (9.77), which is indicated as negative.

As illustrated in FIG. 11, portions of Table X are colored in colors 63a, 63b, 63c, 63d that may facilitate user comprehension of the information included in Table X. For example, colors 63a, 63c may enhance readability. Color 63b emphasizes certain bond types, for example, CDS's, as illustrated. Color 63d emphasizes unfavorable trades, i.e. trades with price P above bid price $P_B$. Associated fonts may also be in color 63d. Various portions of Table X may be colored in various ways to facilitate user comprehension, and the user may select color(s) or portions of Table V to be colored, in various implementations.

Figure 13:
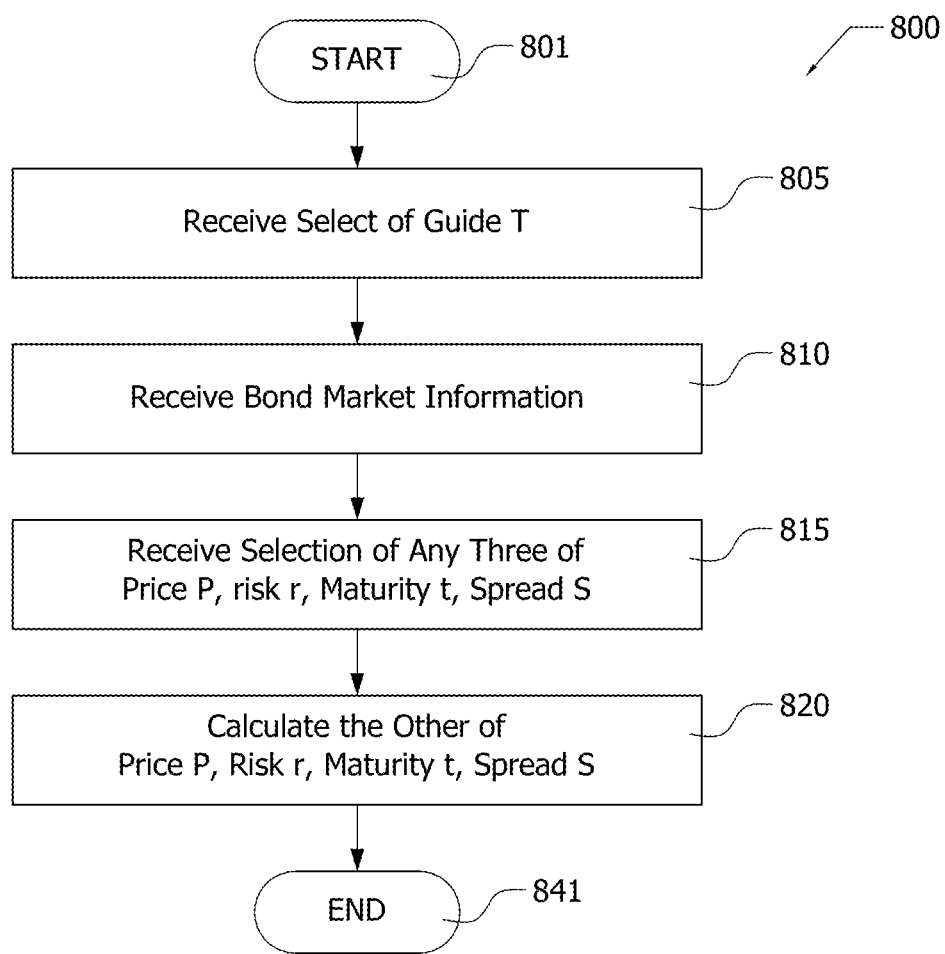

When some quantities are known from bond market information 27, equations (16), (17), (20) to (26) may be solved for other quantities that are unknown, for example, as per exemplary method 800 illustrated in FIG. 13. As illustrated in FIG. 13, method 800 is entered at step 801.

At step 805, selection of guide T is received by a bond information system, such as bond information system 10, for example, by computer, such as computer 20.

At step 810, bond market information, such as bond market information 27, is received, for example, from one or more electronic trading platforms, such as electronic trading platform 12, and/or from one or more information sources, such as information source 15. The bond market information may be communicated to the computer via a network cloud, such as network cloud 13.

At step 815, a selection of any three of price P, risk r, maturity t, and spread S is received by the bond information system as known quantities. The selection may be *sui generis*, may result from user input, or both, in various implementations.

At step 820, the fourth quantity is calculated from the three known quantities. For example, if price P, maturity t, and spread S are known quantities, then risk r may then be calculated from the known price P, maturity t, and spread S using guide T. Method 800 terminates at step 841. Method 800 may be performed automatically by the computer in response to updates in the bond market information automatically communicated to the computer.

Bond information system 10 including methods 300, 400, 500, 600, 700, 800, 900 may be stored as computer readable instructions on a non-transitory computer readable media. For example, the computer readable instructions, when executed, cause a computer to perform the steps of a method of displaying a bond market analysis in real time in response to trading occurring on an electronic trading platform. The method, in various implementations, comprising the step of receiving by a bond information system a user selection comprising a guide T, the guide T comprising one or more guide bonds. The method, in various implementations, comprising the step of communicating bond market information with the bond information system via a network cloud in real time, the bond market information including prices of the one or more guide bonds of the guide T from said trading occurring on said electronic trading platform. The method, in various implementations, comprising the step of transforming the guide T into one or more spreads S using the bond market information, each spread $S=f(r, t, \phi)$ being a function $f$ of golden mean $\phi$ and the function $f$ of risk r and maturity t. Because Fibonacci numbers F may be expressed as functions of golden mean $\phi$, function $f$ is a function of one or more Fibonacci numbers F, in various implementations. The method, in various implementations, comprising the step of organizing the spread S according to maturity/and risk r thereby forming at least a portion of said bond market analysis. The method, in various implementations, comprising the step of displaying said bond market analysis using a display.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72 (b) only. Accordingly, the Abstract is not intended to identify key elements of the methods, apparatus, and compositions of matter disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A method of trading bonds, comprising the steps of:
receiving continuously in real time, by a computer, bond market information from one or more electronic trading platforms, each electronic trading platform of the one or more electronic trading platforms comprising one or more electronic trading computers;
communicating the bond market information in digital form, the bond market information comprising unorganized information in a variety of formats from the one or more electronic trading computers of the one or more electronic trading platforms, the bond market information comprising pricing of bond trading occurring on the one or more electronic trading platforms;
continuously organizing in real time the bond market information into an organized digital form by the computer forming a bond market analysis comprising the organized digital form;
continuously updating in real time, by the computer, the bond market analysis;
selecting, by the computer, a selected bond from bonds trading on the one or more electronic trading platforms;
automatically generating, by the computer, order information corresponding to the selected bond responding in real time to the bond market analysis;
automatically communicating, by the computer via the network cloud, the order information to at least one of the one or more electronic trading computers of the one or more electronic trading platforms; and
executing, by at least one of the one or more electronic trading computers of the one or more electronic trading platforms, the order information while automatically trading, by the computer, the selected bond on another electronic trading platform concurrently in real-time.

2. The method of claim 1, further comprising the step of adjusting a coupon yield of the selected bond to a bid coupon yield using a relationship between the coupon yield and a par yield of the selected bond thereby determining a bid price of the selected bond, the order information comprising the bid price.

3. The method of claim 1, further comprising the step of adjusting a coupon yield of the selected bond to an asked coupon yield using a relationship between the coupon yield and a par yield of the selected bond thereby determining an asked price of the selected bond, the order information comprising the asked price.

4. The method of claim 3, further comprising the step of adjusting a rating of the selected bond to an adjusted rating automatically by the computer using the bond market information, the bond market analysis comprising the adjusted rating.

5. The method of claim 4, wherein a credit default swap corresponding to the selected bond is used in performing the step of adjusting a rating of the selected bond to an adjusted rating automatically by the computer using the bond market information.

6. The method of claim 1, further comprising the step of displaying by the computer at least portions of the bond market analysis.

7. The method of claim 1, wherein a function of at least portions of a Fibonacci sequence is used in performing the step of organizing the bond market information into the organized digital form using the computer.

8. The method of claim 1, wherein the selected bond is selected from all bonds trading on at least one electronic trading platform of the one or more electronic trading platforms.

9. The method of claim 1, wherein the selected bond is selected from a bond group comprising a portion of the bonds trading on the one or more electronic trading platforms.

10. The method of claim 1, wherein the selected bond is trading at par on the one or more electronic trading platforms.

11. The method of claim 1, wherein the selected bond is trading at other than par on the one or more electronic trading platforms.

12. A method of trading bonds, comprising the steps of:
transmitting to a computer via a network cloud bond market information in digital form continuously in real time from one or more electronic trading computers, each electronic trading platform of one or more electronic trading platforms comprising at least one electronic trading computer of the one or more electronic trading computers, the bond market information comprising unorganized information in a variety of formats from the one or more electronic trading computers of the one or more electronic trading platforms, the bond market information comprising pricing of bond trading occurring on the one or more electronic trading platforms;

continuously organizing, by the computer in real time, the bond market information into an organized digital form forming a bond market analysis comprising the organized digital form;

continuously updating in real time, by the computer, the bond market analysis;

selecting, by the computer, a selected bond from bonds trading on the one or more electronic trading platforms;

automatically generating, by the computer, order information corresponding to the selected bond responding in real time to the bond market analysis;

automatically receiving, from the computer, the order information by at least one of the one or more electronic trading computers of the one or more electronic trading platforms via the network cloud; and executing the order information by at least one of the one or more electronic trading computers of the one or more electronic trading platforms while automatically trading, by the computer, the selected bond on another electronic trading platform concurrently in real-time.

13. The method of claim 12, further comprising the step of adjusting a coupon yield of the selected bond to a bid coupon yield using a relationship between the coupon yield and a par yield of the selected bond thereby determining a bid price of the selected bond, the order information comprising the bid price.

14. The method of claim 12, further comprising the step of adjusting a coupon yield of the selected bond to an asked coupon yield using a relationship between the coupon yield and a par yield of the selected bond thereby determining an asked price of the selected bond, the order information comprising the asked price.

15. The method of claim 12, further comprising the step of adjusting a rating of the selected bond to an adjusted rating automatically by the computer using the bond market information, the bond market analysis comprising the adjusted rating.

16. The method of claim 15, wherein a credit default swap corresponding to the selected bond is used in performing the step of adjusting a rating of the selected bond to an adjusted rating automatically by the computer using the bond market information.

17. The method of claim 12, further comprising the step of displaying by the computer at least portions of the bond market analysis.

18. The method of claim 12, wherein functions of Fibonacci numbers are used in performing the step of organizing the bond market information into an organized digital form using the computer.

19. A non-transitory computer readable media comprising computer readable instructions that, when executed, cause a computer to perform the steps of:

receiving continuously in real time, by a computer, bond market information from one or more electronic trading platforms, each electronic trading platform of the one or more electronic trading platforms comprising one or more electronic trading computers;

communicating the bond market information in digital form, the bond market information comprising unorganized information in a variety of formats from the one or more electronic trading computers of the one or more electronic trading platforms, the bond market information comprising pricing of bond trading occurring on the one or more electronic trading platforms;

continuously organizing in real time the bond market information into an organized digital form by the computer forming a bond market analysis comprising the organized digital form; continuously updating in real time, by the computer, the bond market analysis;

selecting, by the computer, a selected bond from bonds trading on the one or more electronic trading platforms;

automatically generating, by the computer, order information corresponding to the selected bond responding in real time to the bond market analysis;

automatically communicating, by the computer via the network cloud, the order information to at least one of the one or more electronic trading computers of the one or more electronic trading platforms; and executing, by at least one of the one or more electronic trading computers of the one or more electronic trading platforms, the order information while automatically trading, by the computer, the selected bond on another electronic trading platform concurrently in real-time.

* * * * *